US008645658B2

(12) United States Patent
Deguchi et al.

(10) Patent No.: US 8,645,658 B2
(45) Date of Patent: Feb. 4, 2014

(54) STORAGE SYSTEM COMPRISING PLURALITY OF STORAGE SYSTEM MODULES

(75) Inventors: Akira Deguchi, Yokohama (JP); Noboru Morishita, Yokohama (JP); Ai Satoyama, Sagamihara (JP); Hisaharu Takeuchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1241 days.

(21) Appl. No.: 12/130,071

(22) Filed: May 30, 2008

(65) Prior Publication Data

US 2009/0254695 A1    Oct. 8, 2009

(30) Foreign Application Priority Data

Apr. 7, 2008   (JP) ................................. 2008-099797

(51) Int. Cl.
*G06F 12/00* (2006.01)
(52) U.S. Cl.
USPC ............... 711/170; 711/6; 711/162; 711/203
(58) Field of Classification Search
None
See application file for complete search history.

(56) References Cited

U.S. PATENT DOCUMENTS

| 6,148,414 | A  | * | 11/2000 | Brown et al. ................. 714/5.1 |
| 6,889,305 | B2 | * | 5/2005  | Adelmann .................... 711/170 |
| 7,100,089 | B1 | * | 8/2006  | Phelps ............................ 714/42 |
| 7,149,859 | B2 | * | 12/2006 | Fujibayashi .................. 711/162 |
| 7,191,304 | B1 | * | 3/2007  | Cameron et al. .............. 711/202 |
| 7,213,124 | B2 |   | 5/2007  | Serizawa et al. |
| 7,412,583 | B2 | * | 8/2008  | Burton et al. ................. 711/170 |
| 7,574,622 | B2 | * | 8/2009  | Soran et al. ................... 714/6.22 |
| 2004/0103261 | A1 | * | 5/2004 | Honda et al. .................. 711/202 |
| 2006/0031594 | A1 | * | 2/2006 | Kodama ........................... 710/5 |
| 2006/0161810 | A1 | * | 7/2006 | Bao .................................. 714/6 |
| 2007/0061540 | A1 | * | 3/2007 | Rafert et al. ................... 711/170 |
| 2007/0174574 | A1 |   | 7/2007 | Kano |
| 2007/0255925 | A1 |   | 11/2007 | Serizawa et al. |
| 2008/0034005 | A1 |   | 2/2008 | Satoyama et al. |
| 2008/0059752 | A1 |   | 3/2008 | Serizawa |

FOREIGN PATENT DOCUMENTS

| JP | 2005-11316  | 1/2005  |
| JP | 2006-302258 | 11/2006 |
| JP | 2008-059353 | 3/2008  |

OTHER PUBLICATIONS

U.S. Appl. No. 11/972,024, filed Jan. 10, 2008.

* cited by examiner

*Primary Examiner* — Matthew Bradley
*Assistant Examiner* — Ramon A Mercado
(74) *Attorney, Agent, or Firm* — Antonelli, Terry, Stout & Kraus, LLP.

(57) ABSTRACT

A plurality of modules (1) and (2) comprise a plurality of virtual volumes with which the same volume identification number is associated. A module (2), which receives a write request from a computer, searches for an unallocated real area from among a plurality of real areas in the module (2) rather than from among a plurality of real areas in the other module (1) if a real area has not been allocated to a write-targeted virtual area in accordance with the write request. The module (2) allocates the real area retrieved from the module (2) to the write-targeted virtual area, and writes data according to the write request to this real area.

24 Claims, 26 Drawing Sheets

FIG. 3

| PORT NUMBER | VOLUME NUMBER | MODULE NUMBER 2221 |
|---|---|---|
| 1 | 0 | MODULE (1) |
| 1 | 1 | MODULE (1) |
| 1 | 2 | MODULE (1) |
| 1 | 3 | MODULE (2) |

FIG. 5

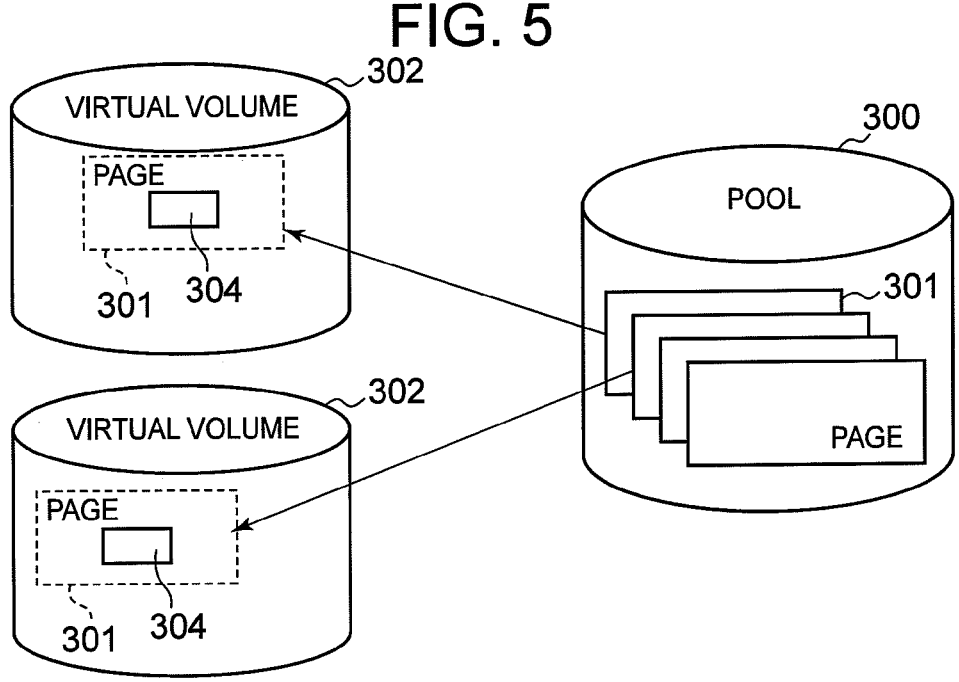

FIG. 6

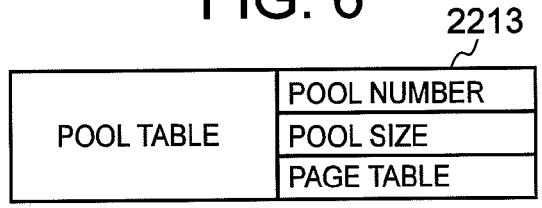

| POOL TABLE | POOL NUMBER  2213 |
|---|---|
|  | POOL SIZE |
|  | PAGE TABLE |

| PAGE NUMBER | START ADDRESS | END ADDRESS | STATUS | ALLOCATION DESTINATION |
|---|---|---|---|---|
| 1 | 0 | 99 | ALLOCATED | VIRTUAL VOLUME 1 |
| 2 | 100 | 299 | ALLOCATED | VIRTUAL VOLUME 1 |
| 3 | 300 | 349 | ALLOCATED | VIRTUAL VOLUME 5 |
| 4 | 350 | 694 | UNALLOCATED | - |

| VIRTUAL VOLUME NUMBER | ADDRESS | PAGE ALLOCATION STATUS | ALLOCATION MODULE | POOL NUMBER | PAGE NUMBER |
|---|---|---|---|---|---|
| 1 | 0-99 | ALLOCATED | MODULE (0) | 1 | 1 |
| 1 | 100-199 | ALLOCATED | MODULE (0) | 1 | 2 |
| 1 | 200-299 | ALLOCATED | MODULE (1) | 1 | 3 |
| 1 | 300-399 | UNALLOCATED | - | - | - |

| VIRTUAL VOLUME NUMBER | ADDRESS | PAGE ALLOCATION STATUS | ALLOCATION MODULE | POOL NUMBER | PAGE NUMBER | REPLICATED BIT | REPLICATION MODULE | READ FREQUENCY |
|---|---|---|---|---|---|---|---|---|
| 1 | 0-99 | ALLOCATED | MODULE2 | POOL1 | 1 | ON | MODULE1 | 1000 PER SECOND |
| 1 | 100-199 | ALLOCATED | MODULE2 | POOL1 | 2 | ON | MODULE1 | 1200 PER SECOND |
| 1 | 200-299 | ALLOCATED | MODULE1 | POOL2 | 3 | OFF | - | 20 PER SECOND |
| 1 | 300-399 | ALLOCATED | MODULE2 | POOL1 | 5 | ON | MODULE1 | 900 PER SECOND |

STORAGE SYSTEM COMPRISING PLURALITY OF STORAGE SYSTEM MODULES

CROSS-REFERENCE TO PRIOR APPLICATION

This application relates to and claims the benefit of priority from Japanese Patent Application number 2008-99797, filed on Apr. 7, 2008, the entire disclosure of which is incorporated herein by reference.

BACKGROUND

The present invention generally relates to a storage system that comprises a plurality of storage system modules.

A storage system having a dynamic capacity allocation function is known as one storage system that comprises a plurality of physical storage devices (for example, refer to Japanese Patent Laid-open No. 2005-011316 and Japanese Patent Laid-open No. 2006-302258). This storage system comprises a virtual logical volume (hereinafter, referred to as a "virtual volume") and a storage area pool (hereinafter, referred to as a "pool"). The virtual volume is comprised of a plurality of virtual storage areas (hereinafter, referred to as "virtual areas"). The pool is comprised of a plurality of real storage areas (hereinafter, referred to as "real areas"). A real area is a storage area based on a plurality of physical storage devices.

In accordance with the dynamic capacity allocation function, the occurrence of a data write to a virtual area in the virtual volume triggers the allocation of a real area in the pool to this virtual area, and the data is written to this allocated real area.

Incidentally, a storage system configured with a plurality of storage system modules (hereinafter, abbreviated as "modules") is conceivable. Hereinafter, a storage system configured using a plurality of modules will be called a "modular storage system". Each module comprises a plurality of physical storage devices, and a controller for controlling access to the plurality of physical storage devices. The plurality of modules can be operated and managed so as to appear to be a single storage system. Further, the storage capacity and throughput of the storage system can be changed as needed by increasing or decreasing the modules.

When the above-mentioned dynamic capacity allocation function is employed in a modular storage system, for example, the configuration shown in FIG. 30 is conceivable.

That is, a modular storage system is configured with a module (A) having a port (A) and a pool (A), and a module (B) having a port (B) and a pool (B). Modules (A) and (B) are managed as though they are a single storage system. For this reason, the host (H) recognizes the single storage system as having ports (A) and (B).

Only module (A) comprises the virtual volume (VVOL). Since the host (H) is able to access the virtual volume (VVOL) via either port (A) or port (B), in addition to a first path (P1), which links port (A) to the virtual volume (VVOL), a second path (P2), which links port (B) to the virtual volume (VVOL) is established.

If consideration is given to a case in which a data write request (W) is sent from the host (H) to a virtual area (V) in the virtual volume (VVOL), the following four scenarios are conceivable.
Case W1: Module (A) receives the write request (W) via the first path (P1), and allocates a real area in pool (A) to the virtual area (V).
Case W2: Module (A) receives the write request (W) via the first path (P1), and allocates a real area in pool (B) to the virtual area (V).
Case W3: Module (A) receives the write request (W) via the second path (P2), and allocates a real area in pool (A) to the virtual area (V).
Case W4: Module (A) receives the write request (W) via the second path (P2), and allocates a real area in pool (B) to the virtual area (V).

Although not shown in FIG. 30, even if consideration is given to a case in which a read request (R) for data from a virtual area (V) is sent from the host (H), the following four scenarios, that is, the same kind of cases as those described hereinabove, are conceivable.
Case R1: Module (A) receives the read request (R) via the first path (P1), reads out the data from a real area in pool (A) and sends this data to the host (H).
Case R2: Module (A) receives the read request (R) via the first path (P1), reads out the data from a real area in pool (B) and sends this data to the host (H).
Case R3: Module (A) receives the read request (R) via the second path (P2), reads out the data from a real area in pool (A) and sends this data to the host (H).
Case R4: Module (A) receives the read request (R) via the second path (P2), reads out the data from a real area in pool (B) and sends this data to the host (H).

In the above-described cases W2 through W4 and R2 through R4, communications (hereinafter, referred to as "inter-module communications") are required between module (A) and module (B). For example, in Case W2, inter-module communications for allocating a real area in pool (B) to the virtual area (V) take place. In Case W3, inter-module communications for transferring the write request (W) via port (B) to module (A) take place. In Case W4, inter-module communications for transferring the write request (W) via port (B) to module (A), and inter-module communications for allocating a real area in pool (B) to the virtual area (V) take place.

In accordance with the considerations described above, I/O performance can degrade as a result of the occurrence of inter-module communication even when a write request/read request (I/O request) is by way of the same port (A) or (B) (More specifically, the length of time from when the modular storage system receives an I/O request from the host (H) until a response is returned to the host (H) increases.). Further, since the number of times that inter-module communications occur will differ when the port through which the I/O requests (write request/read request) pass differs, I/O performance may differ.

SUMMARY

Therefore, an object of the present invention is to prevent as much as possible the occurrence of inter-module communications in a modular storage system.

Another object of the present invention is to ensure that I/O performance is as uniform as possible no matter which port of a modular storage system an I/O request passes through.

Yet other objects of the present invention should become clear from the explanations that follow.

The plurality of modules comprises a plurality of virtual volumes with which the same volume identification number is associated. If a real area has not been allocated to a virtual area targeted for a write in accordance with a write request, the module (the own module) that received this write request from a higher-level device searches for an unallocated real area not from among the plurality of real areas in the other module, but rather from among the plurality of real areas in the own module itself. The own module allocates to the write-targeted virtual area the real area detected in the own module, and writes the data according to the write request to this real area. The plurality of modules, for example, can be configured from one or more first modules and one or more second modules. The first and second modules have the same functions.

BRIEF DESCRIPTION OF THE DRAWINGS

FIG. 3 is a diagram showing an example of a path information table;

FIG. 5 is a diagram showing an example of virtual volume technology;

FIG. 6 is a diagram showing an example of a pool table;

FIG. 7 is a diagram showing an example of a page table;

FIG. 8 is a diagram showing an example of a virtual volume table;

FIG. 17 is a diagram showing an example of a virtual volume table in the second embodiment;

DESCRIPTION OF THE PREFERRED EMBODIMENTS

Several embodiments of the present invention will be explained hereinbelow be referring to the figures. Further, it is supposed that when computer program is the subject hereinbelow, the processing is actually carried out by the processor (CPU) that executes this computer program.

First Embodiment

Figure 1:
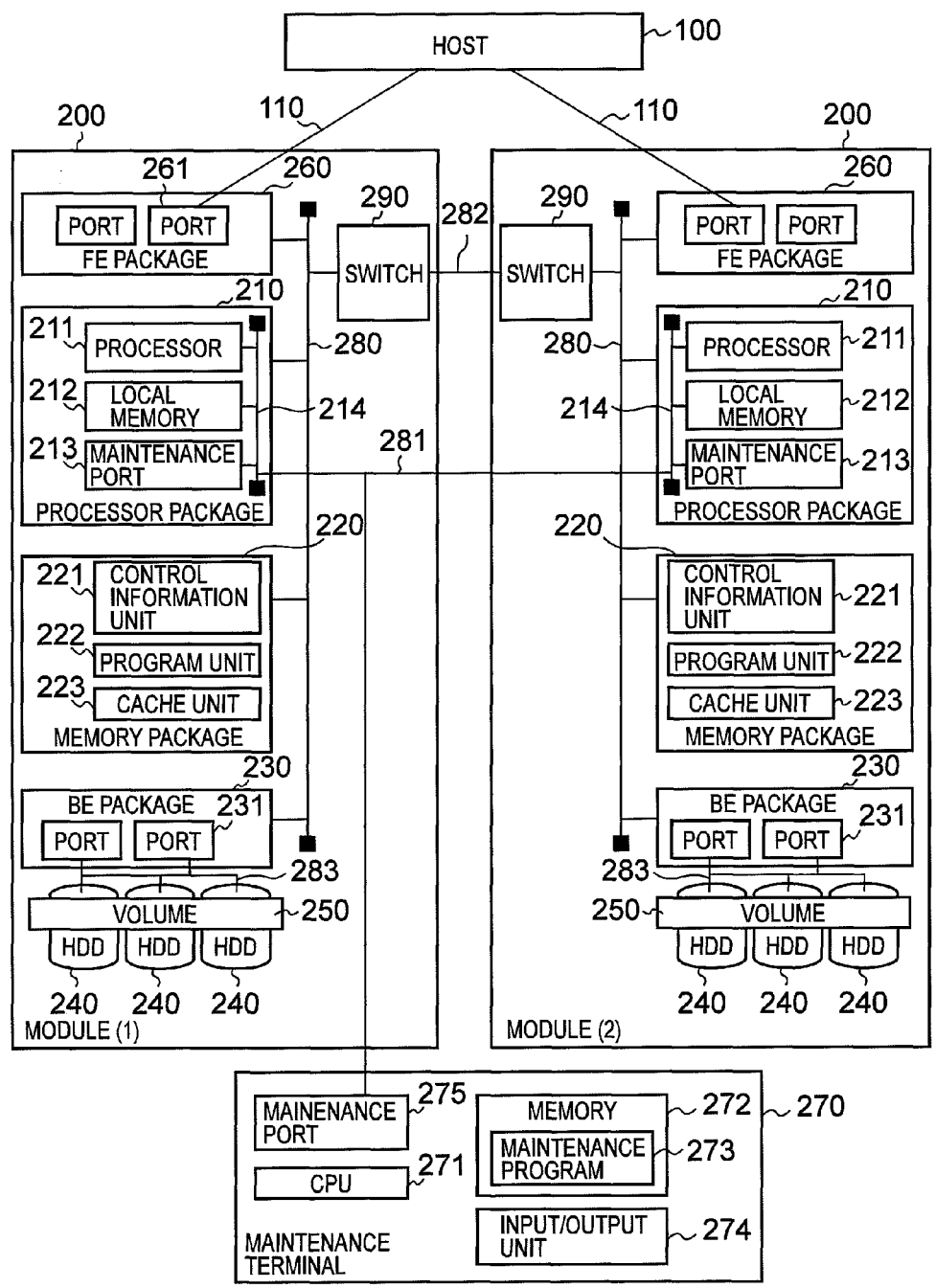
FIG. 1 shows one example of the overall configuration of a computer system related to a first embodiment of the present invention.

FIG. 1 shows an example of the overall configuration of a computer system related to a first embodiment.

This computer system comprises a host 100; a modular storage system (hereinafter abbreviated as "storage system"); and a maintenance terminal 270. The storage system, for example, is configured by two storage system modules (hereinafter, referred to as "modules") 200. A module 200 is one element of the storage system (a subsystem) that comprises a controller and a physical storage device. Further, the host 100 and the respective modules 200 are connected via a first communication network 110. Further, the modules 200 themselves are connected via a second communication network 282. The second communication network 282 is independent from the first communication network 110. Another type of communication medium, such as either a first or second leased line, can be employed instead of either the first or second communication network 110, 282.

The two modules 200 are recognized by the host 100 as being one storage system. When distinguishing between the two modules 200 in the following explanation, these modules 200 will be referred to as "module 1" and "module 2". Furthermore, in the first embodiment, there are two modules 200, but there can also be three or more modules 200.

The host 100 is a computer that sends an I/O request to the modular storage system.

The maintenance terminal 270 is a terminal (computer) for maintaining the storage system, and is coupled to the respective modules 200 via a third communication network 281. The maintenance terminal 270 comprises a maintenance port 275; CPU 271; memory 272; and input/output unit 274. The maintenance port 275 is coupled to a maintenance port 213 in a processor package 210. Operating information is acquired from the processor package 210, and a maintenance operation is sent to the processor package 210 by way of the maintenance port 275. The memory 272 stores a maintenance program 273. The CPU 271 realizes maintenance by reading out and executing the maintenance program 273 from the memory 272. Furthermore, the memory 272 can also store information acquired from the processor package 210. The input/output unit 274 is the user interface (for example, a keyboard, mouse, monitor or the like) for receiving an operation from the user, and displaying storage system operating information to the user. Furthermore, it is supposed that the maintenance terminal 270 has a power source (not shown in the figure).

A module 200 comprises a controller; HDD (Hard Disk Drive) 240; and switch 290. The controller is configured from a front end package 260 (hereinafter, referred to as the "FE package"); the processor package 210; a memory package 220; and a back end package 230 (hereinafter, abbreviated as "BE package"). The respective elements and switch 290 that configure the controller are interconnected via an internal network (for example, a crossbar switch) 280. Furthermore, at least one of the FE package 260, processor package 210, memory package 220, and BE package 230 can be a plurality of packages.

The FE package 260 has one or more ports 261. The port 261 is coupled to a port (not shown in the figure) via which an I/O request is outputted from the host 100 by way of the first communication network 110, and receives the I/O request (write request/read request) from the host 100.

The processor package 210 has a processor (for example, a microprocessor) 211; local memory 212; and maintenance port 213. These are interconnected via an in-package network (for example, a CPU bus) 214. At least one of the processor 211, local memory 212, and maintenance port 213 in one processor package 210 can be a plurality.

The processor 211 executes the processing of an I/O request from the host 100 by executing a computer program stored in a program unit 222 of the memory package 220.

The local memory 212, in addition to temporarily storing data, which is temporarily used by the computer program executed by the processor 211, also stores data (control information, application data, or a program) that has been stored in the HDD 240 or memory package 220. The physical distance from the processor 211 to the local memory 212 is shorter than the physical distance from the processor 221 to the memory package 220 or HDD 240. Thus, data to be used in a process executed by the processor 211 can be processed more rapidly by storing this data in the local memory 212 rather than storing it in the memory package 220 or HDD 240.

Maintenance port 213 is coupled to maintenance port 275 in the maintenance terminal 270 via the third communication network 281. Processor package 210 operating information is sent to the maintenance terminal 270, and a maintenance operation is received from the maintenance terminal 270 by way of the maintenance port 213.

The memory package 220 is configured by either one or a plurality of memories, and has a control information unit 221; program unit 222; and cache unit 223. The program unit 222 stores programs for realizing processing executed by the storage system 200. The control information unit 221 stores the control information used by these programs. The programs and control information stored in the memory package 220 are read out from the processor 211 in the processor package 210. The cache unit 223 temporarily stores data inputted/outputted to/from the HDD 240. If there is target data in the cache unit 223, the processor 211 can acquire the target data from the cache unit 223 without accessing the HDD 240. If high-frequency use data, which has been stored in the HDD 240, is stored in the cache unit 223, the processing speed for an I/O request from the host 100 can be expected to improve. Furthermore, the memory package 220 can be made redundant to avoid losing data when a failure occurs.

The BE package 230 has one or more ports 231. The port 231 is coupled to the HDD 240 via a back end communication network (for example, a fibre channel network) 283. Write-targeted data temporarily stored in the cache unit 223 is written to the HDD 240, and read-targeted data, which is read out from the HDD 240, is temporarily stored in the cache unit 223 via this port 231.

The switch 290 is coupled to the front end package 260, back end package 230, processor package 210, and memory package 220, and is a circuit board for controlling communications among these elements. The switch 290 in the own module 200 is coupled to the switch 290 in the other module 200. Inter-module communications is carried out via the switches 290. Furthermore, hereinafter, the coupling of the switches 290 may be called "loose coupling", and inter-element coupling via the internal network 280 may be called "tight coupling". This is because packages in own module 200 are able to directly reference and update control information stored in the cache unit 223 of this module 200, and, conversely, directly referencing and updating control information stored in the cache unit 223 of the other module 200 is not permitted from the own module 200, but the processor 211 in the own module 200 can indirectly reference and update this control information by making a request to the processor 211 in the other module 200. That is, tight coupling refers to coupling by which it is possible to directly reference and update control information, and loose coupling refers to coupling via which the control information is indirectly referenced and updated.

The HDD 240 stores data, which is used by software (for example, a database management system) executed by the host 100, that is, data that is the target of an I/O request from the host 100. Further, one or more HDD 240 can be grouped together into a unit called a parity group (or RAID group). That is, high reliability can be realized using a method such as RAID (Redundant Arrays of Inexpensive Disks). The respective storage areas that configure the storage space for the parity group can by a volume 250, which is a logical storage device. Furthermore, in the first embodiment, HDD 240 is used as the physical storage device, but other types of physical nonvolatile storage devices, such as flash memory or DVD can also be employed. Further, a plurality of types of physical storage devices can be intermixed in own module 200 or one storage system.

Figure 2:
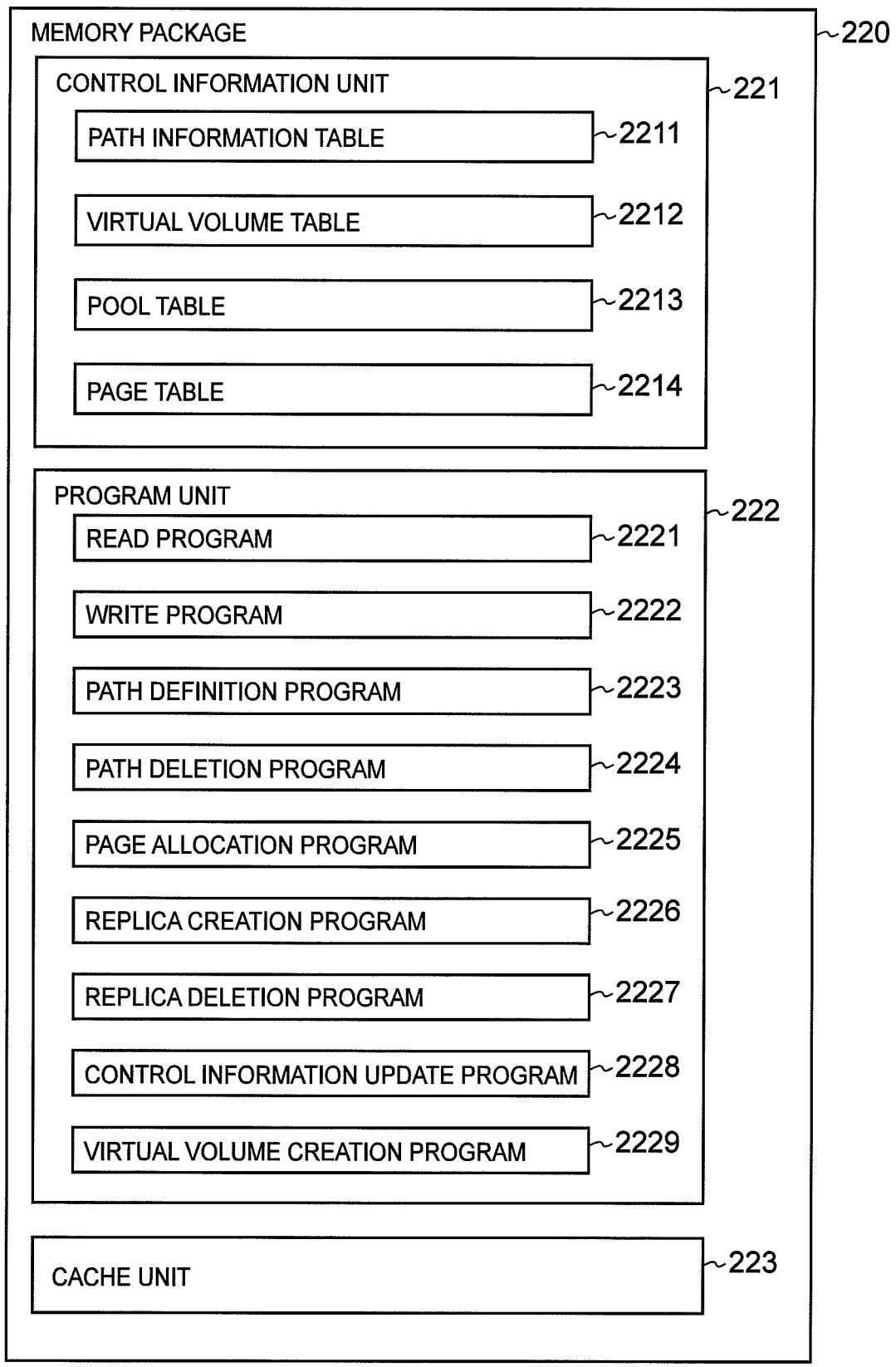
FIG. 2 is a diagram showing a detailed example of a memory package.

FIG. 2 shows the details of the memory package 220.

As the control information stored in the control information unit 221, for example, there is a path information table 2211 in which path-related information is recorded; a virtual volume table 2212 in which virtual volume-related information is recorded; a pool table 2213 in which pool-related information is recorded; and a page table 2214 in which page-related information, which will be explained hereinbelow, is recorded. The computer programs stored in the program unit 222, for example, include a read program 2221 that controls a read process; a write program 2222 that controls a write process; a path definition program 2223 for defining a path; a path deletion program 2224 for deleting a path that has been defined; a page allocation program 2225 for allocating a page to a virtual area; a replica creation program 2226 for replicating data between the modules in page units; a replica deletion program 2227 for deleting a replicated page; a control information update program 2228 for updating control information; and a virtual volume creation program 2229 for creating a virtual volume. These tables and programs will be explained in detail hereinbelow. Furthermore, either all or part of the processing carried out in accordance with these computer programs 2221 through 2229 being executed by the processor can be realized using a different type of processing unit, such as a hardware circuit.

As described hereinabove, modules (1) and (2) are recognized as a single storage system by the host 100. Thus, when the administrator defines a path (I/O path) that links to the volume 250 of module (2), there is a possibility that the port 261 of module (1) will be specified. When a specification like this is made, I/O processing must be realized as follows. That is, module (1) receives the I/O request from the host 100, and requests that module (2) carry out I/O processing. Module (2) receives this request, and executes the I/O for the volume 250 in module (2). An I/O like this will hereinafter be called an "I/O spanning the modules 200". A method of processing an I/O spanning the modules 200 will be explained next.

First, the control information for realizing an I/O spanning the modules 200 will be explained.

FIG. 3 shows a path information table 2211 in detail.

The path information table 2211 records a port number, volume number and module number for each path.

One path (hereinafter, referred to as the "target path" in this paragraph) will be explained. The "port number" is the identification number of the port 261, which is one configuration element of the target path. The "volume number" is the identification number of the logical volume (for example, volume 250 or the below-described virtual volume) linked to the target path. In the first embodiment, the path information is configured by the port number and the volume number. The "module number" is the identification number of the module 200 that has the logical volume linked to the target path. According to the example of FIG. 3, volume 0, volume 1 and volume 2 are in module (1), and volume 3 is in module (2).

Figure 4:
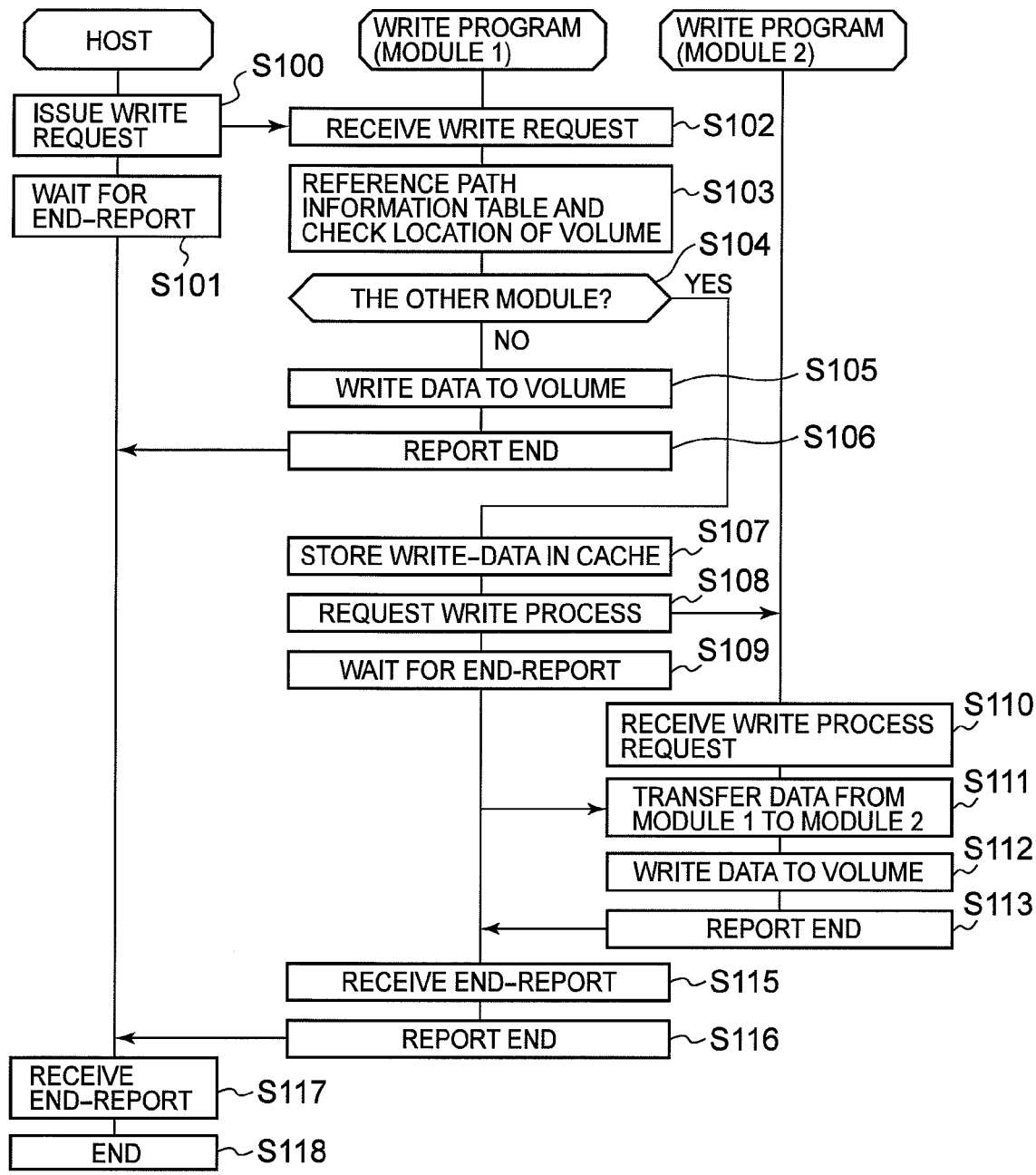
FIG. 4 is a diagram showing an example of the flow of I/O processing in a modular storage.

FIG. 4 will be used to explain an example of a write process as an I/O spanning the modules 200.

The write process is realized by the write program 2222 being executed in both module (1) and module (2). In the explanation of FIG. 4, the write program 2222 executed by the processor 211 of module (1) will be referred to as "write program (1)", and the write program 2222 executed by the processor 211 of module (2) will be referred to as "write program (2)". Furthermore, hereinafter when distinguishing between the same types of elements in modules (1) and (2), the symbols (1) and (2) may be used in place of the reference numerals the same as for the write program 2222.

The host 100 uses the path of the module (1) port 261 to issue a write request (S100), and waits for a write-end report from the storage system (S101).

When the host 100 uses the above-mentioned path to issue the write request, module (1) receives the write request (S102). Write program (1) references the path information table (1), and checks the location of the write-destination volume 250 of the write-data (write-targeted data) (S103). Write program (1) determines whether the module 200 having the write-destination volume 250 is module (1) or module (2) (S104). When the module 200 is determined to be module (1) in S104 (S104: NO), write program (1) writes the write-data to the write-destination volume 250 (S105), and reports write-end to the host 100 (S106). Conversely, when the module 200 is determined to be module (2) in S104 (S104: YES), write program (1) stores the write-data in the cache unit (1). Then, write program (1) requests that module (2) carry out write processing (S108), and waits for a response from module (2) (S109). Write program (1) notifies module (2) of the cache address of the write-data at this time. The cache address is the address of the storage area in which the write-data is stored, and is the address of the storage area in the cache unit 223 (hereinafter, cache area).

Write program (2) receives the write processing request from module (1) (S110), transfers the write-data from the cache area specified by the cache address received together with this request to module (2) (reads out the write-data from the cache area) (S111), and writes this write-data to the write-destination volume 250 (S112). Subsequent to the write ending, write program (2) reports write-end to module (1) (S113).

Write program (1), upon receiving the write-end report from write program (2), reports write-end to the host 100 (S116).

The host 100, upon receiving the write-end report from module (1) (S117), ends processing (S118).

An example of a write has been explained as an I/O that spans the modules 200, but in the case of a read, for example, the following processing is carried out. That is, Step S107 is omitted, and in Step S108, read program (1) issues a read request to module (2). Read program (2) receives this read request, reads out the read-data (read-targeted data) from the read-destination volume 250 and stores the read-data to the cache unit (2), and notifies module (1) of the cache address of the read-data (the address of the cache area in the cache unit (2)). Read program (1) transfers the read-data from module (2) to module (1) the same as in Step S111 (that is, read program (2) reads out the read-data from the cache area specified by the notified cache address). Finally, read program (1) transfers the read-data to the host 100 together with a read-end report.

As described hereinabove, it is possible to realize a write or read that spans the modules 200. However, since inter-module communications are carried out for an I/O spanning the modules 200, I/O performance is degraded. Furthermore, when a first path having FE port (1) and a second path having FE port (2) are established between the volume 250 in module (1) and the host 100, I/O performance will differ in accordance with whether the first path or second path is used (that is, in accordance with whether FE port (1) or (2) receives the I/O request).

In the first embodiment, both modules (1) and (2) comprise virtual volume technology (the dynamic capacity allocation function), and a scheme for avoiding a degrading in I/O performance is provided. This scheme will be explained hereinbelow, but prior thereto, FIGS. 5 through 8 will be used to explain the virtual volume.

FIG. 5 shows an overview of virtual volume technology.

Modules (1) and (2) comprise a virtual volume 302 and a pool 300.

The virtual volume 302 differs from a logical volume configured from real areas like volume 250, and is a virtual logical volume that does not have a real area. The virtual volume 302 is configured from a plurality of virtual storage areas (virtual areas).

The pool 300, for example, is a storage space configured by the volume 250, and is configured from a plurality of pages 301. As used here, a "page" is a configuration element of the volume 250, and is a real storage area (real area) based on the HDD 240. When a page 301 is allocated to a virtual area, the write-data 304, which uses this virtual area as the write destination, is written to the allocated page 301. The storage capacity of one virtual area can be the storage capacity of a prescribed number (for example, one) of pages 301, or the storage capacity of one page 301 can be the storage capacity of a prescribed number (for example, one) of virtual areas.

Furthermore, there does not have to be a pool 300 for each virtual volume 302. For example, a page 301 can be allocated from one pool 300 to a plurality of virtual volumes 302, or a page 301 can be allocated to one virtual volume 302 from a plurality of pools 300. A page 301 can also be allocated to the virtual volume 302 from a pool 300 in the other module 200, which does not have this virtual volume 302.

FIG. 6 is an example of a pool table 2213.

The pool table 2213 is a table that exists for each pool 300. The pool table 2213 records the pool number, pool size, and page table of the pool 300 corresponding to this table 2213. The "pool number" is the identification number of the above-mentioned corresponding pool 300. The "pool size" is the storage capacity of the above-mentioned corresponding pool 300. The "page table" is information for managing the respective pages 301 of the above-mentioned corresponding pool 300, and more specifically, is the information shown in FIG.

7. That is, the page table 2214 records the page number, start address, end address, status and allocation destination for each page 301 that configures the above-mentioned corresponding pool 300. One page 301 (hereinafter, referred to as the "target page 301" in this paragraph) will be explained. The "page number" is the identification number of the target page 301. The "start address" is the start address of the target page 301 in the pool 300, and the "end address" is the end address of the target page 301 in the pool 300. The "status" is the status of the target page 301, and, for example, signifies whether or not the target page 301 has been allocated to a virtual volume. The "allocation destination" is the volume number of the virtual volume 302 having the allocation-destination virtual area of the target page 301. When the value of the "status" is "unallocated", for example, a meaningless value (for example, "–") is used as the value of the "allocation destination". Furthermore, in the first embodiment, to make the explanation simpler, one page 301 is a fixed size, but a variable size can also be used by managing the page size in the page table 2214.

FIG. 8 shows an example of a virtual volume table 2212.

The virtual volume table 2212 records a virtual volume number, address, page allocation status, allocation module, pool number, and page number for each virtual area. One virtual area (hereinafter, referred to as the "target virtual area" in the explanation of FIG. 8 (and FIG. 17)) will be explained hereinbelow. The "virtual volume number" is the identification number of the virtual volume having the target virtual area. The value of the "virtual volume number" can also be recorded in the path information table 2211 (refer to FIG. 3) as the "volume number". The "address" is the address of the target virtual area in the virtual volume, and, for example, is represented as the combination of the first address and last address of the target virtual area. The "page allocation status" signifies whether or not a page 301 has been allocated to the target virtual area. The "allocation module" is the identification number of the module 200 having the page (hereinafter, will be referred to as the "target page" in the explanation of FIG. 8) 301 that has been allocated to the target virtual area. The "pool number" is the identification number of the pool having the target page 301. The "page number" is the identification number of the target page 301.

Figure 9:
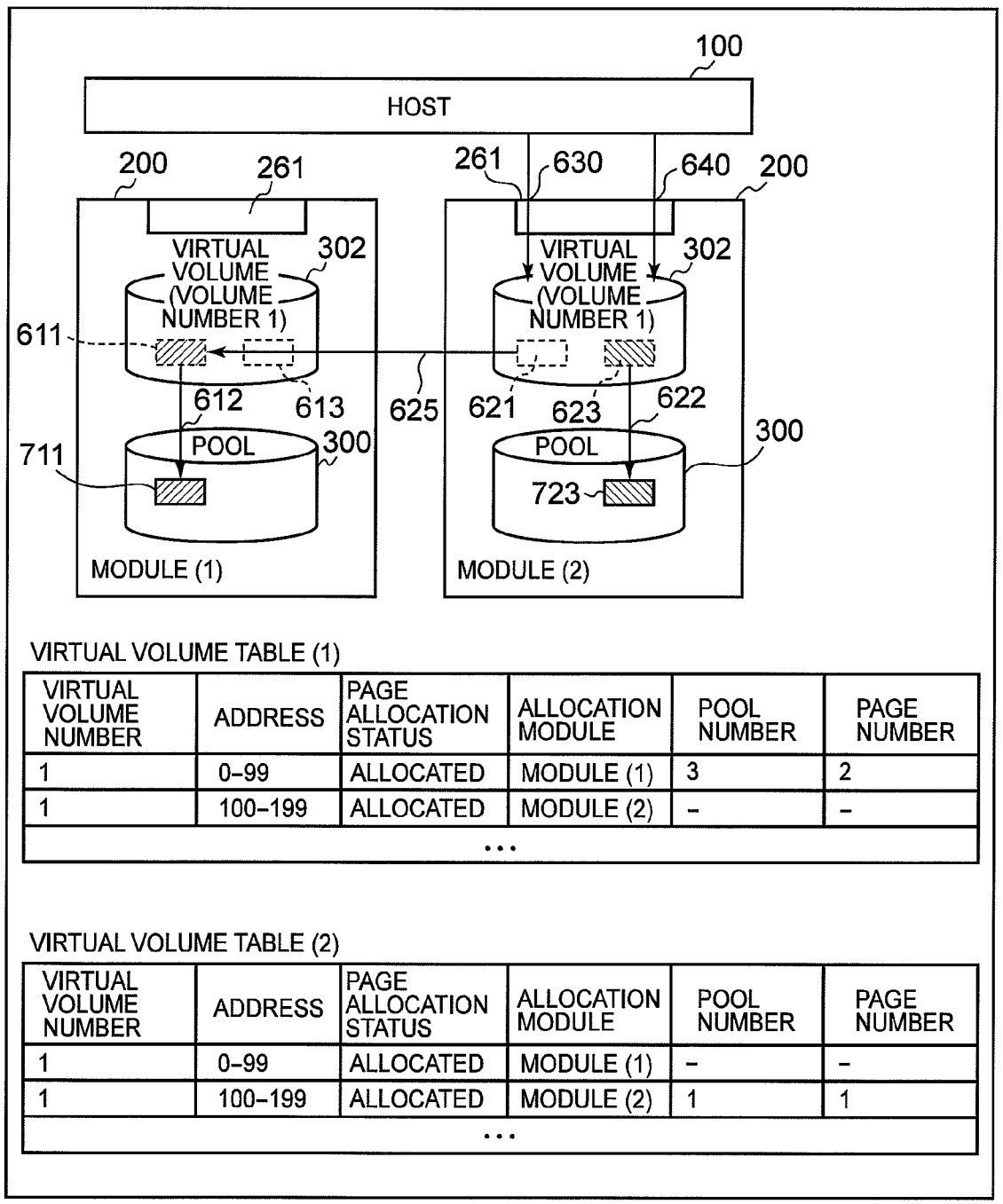
FIG. 9 is a schematic diagram of an overview of one characteristic feature of the first embodiment.

FIG. 9 is a schematic diagram of an overview of one characteristic feature of the first embodiment. In the following explanation, the module that receives the I/O request will be sometimes referred to as "the own module" and the module that does not received the I/O request will be sometimes referred to as "the other module".

In the first embodiment, for example, the below-described (Scheme 1) and (Scheme 2) are provided.

(Scheme 1) Both module (1) and module (2) comprise a virtual volume 302 for which the same volume number has been allocated.

(Scheme 2) When the modules (1) and (2) receive a write request, if a page 301 has not been allocated to the write-destination virtual area specified by this write request, the modules (1) and (2) allocate a page 301 in the pool 300 in the own module to the write-destination virtual area.

Furthermore, in (Scheme 1), for example, the volume number, for example, can be a double number. That is, the volume number can be a first type volume number, which is recognized by the host 100 and which is common to both modules (1) and (2) (a global number), and a second type volume number, which is recognized by the individual modules 200 without being recognized by the host 100 (a local number).

A specific example will be explained hereinbelow.

Modules (1) and (2) comprise virtual volumes (1) and (2), which have been allocated the same volume number "1". Since the volume number is the same for virtual volumes (1) and (2), virtual volumes (1) and (2) are not recognized separately by the host 100, but rather are recognized as a single logical volume in which virtual volumes (1) and (2) have been merged (hereinafter, will be referred to as "volume (T)" in the explanation that refers to FIG. 9).

When module (1) receives a write request for which the first virtual area is the write-targeted virtual area, a page 711 in pool (1) is allocated to the first virtual area 611 of virtual volume (1) as indicated by arrow 612, and the write-data is written to this page 711. Similarly, when module (2) receives a write request for which the second virtual area is the write-targeted virtual area, a page 723 in pool (2) is allocated to the second virtual area 623 of virtual volume (2) as indicated by arrow 622, and the write-data is written to this page 723.

In the above-mentioned case, the host 100 recognizes that the write-data has been stored in the first storage area (addresses "0 through 99") and the second storage area (addresses "100 through 199") on volume (T). Further, virtual volume tables (1) and (2) are as respectively shown in FIG. 9. That is, because a page 301 in pool (1) has not been allocated to the second virtual area 613 (addresses "100 through 199") in virtual volume (1), but a page 301 in pool (2) has been allocated to the second virtual area 623 in virtual volume (2), virtual volume table (1) records "allocated" as the value of the "page allocation status", and records "module (2)" as the value of the "allocation module". Similarly, because a page 301 in pool (2) has not been allocated to the first virtual area 621 (addresses "0 through 99") in virtual volume (2), but a page 301 in pool (1) has been allocated to the first virtual area 611 in virtual volume (1), virtual volume table (2) records "allocated" as the value of the "page allocation status", and records "module (1)" as the value of the "allocation module".

Upon receiving a read request for reading out read-data from the second virtual area 623 as indicated by arrow 640, module (2) references virtual volume table (2), and checks the "page allocation status" of the second virtual area 623. As a result of the check, module (2) recognizes that the read-data is stored in a page 301 in module (2) (a page 301 corresponding to pool number "1" and page number "1"). Thus, module (2) reads out the read-data from this page 301 in the own module, and transfers the read-data to the host 100.

Further, writing data to the virtual area 623 to which a page 301 has been allocated is realized the same as in the case of the read. That is, inter-module communications are not required.

Applying the above-described (Scheme 1) and (Scheme 2) makes it possible to reduce the number of inter-module communications when repeatedly executing a write or read from the port of the same module.

Conversely, upon receiving a read request for reading out read-data from the first virtual area 621 as indicated by arrow 630, module (2) references virtual volume table (2) and checks the "page allocation status" of the first virtual area 621. As a result of the check, module (2) recognizes that a page in module (1) is being used. Thus, module (2) requests that module (1) carry out read processing as indicated by arrow 625. Module (1) receives this request, and reads out the read-data from the page 301 in module (1) (the page 301 corresponding to pool number "3" and page number "2"), which has been allocated to the first virtual area 611 of virtual volume (1). The read-out read-data is transferred from module (1) to module (2), and this read-data is transferred from module (2) to the host 100.

Now then, (TM1) and (TM2) below are conceivable as creation triggers and creation methods for the virtual volume 302.

(TM1) The user triggers the creation of the virtual volume 302, and virtual volumes 302 are created in all of the modules 200.

(TM2) The user triggers the creation of the virtual volume 302, and the virtual volume 302 is created only in the module 200 specified by the user. Then, triggered by a path to this virtual volume being defined from the port 261 of the other module 200, this virtual volume 302 is created in the other module 200.

Figure 10:
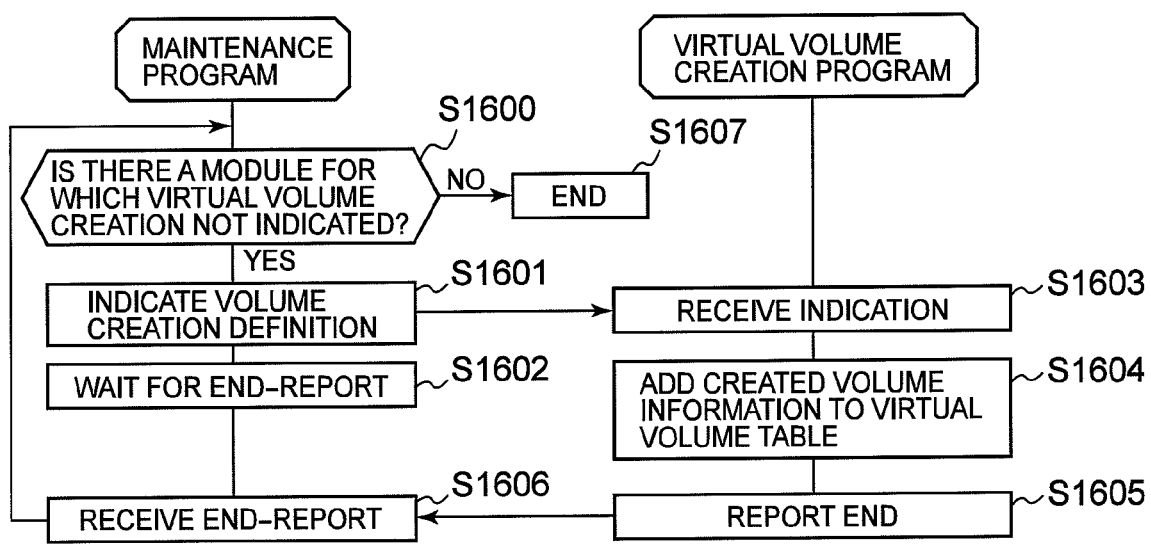
FIG. 10 is a diagram showing an example of the process for creating a virtual volume.

FIG. 10 will be used to explain an example of the processing related to the above-described (TM1).

When the user indicates virtual volume creation from the maintenance terminal 270, virtual volume creation is carried out by executing the maintenance program 273 of the maintenance terminal 270, and the virtual volume creation programs 2229 of the respective modules 200. The user specifies the volume number of the virtual volume 302 to be created to the maintenance terminal 270.

The maintenance program 273 determines whether or not there is a module 200 for which virtual volume creation has not been indicated (S1600). When virtual volume creation has been indicated for all the modules 200, Step S1607 is carried out (that is, processing ends). By contrast, when there is a module 200 for which virtual volume creation has not been indicated, Steps S1601 through S1606 are executed.

The maintenance program 273 indicates virtual volume creation to the module 200 (S1601), and waits for an end report from the indication-destination module 200 (S1602). Furthermore, the maintenance program 273 notifies the module 200 of the volume number of the virtual volume 302 to be created (for example, the number specified by the user) together with the virtual volume creation command.

The virtual volume creation program 2229 receives the virtual volume creation command from the maintenance program 273 (S1603), and registers the virtual volume information in the virtual volume table 2212 (S1604). More specifically, for example, as the virtual volume information, the value of the "virtual volume number" is the number notified from the maintenance program 273; the values of the "page allocation status" are all "not allocated"; and the values of the "allocation module" and "page number" are values (for example, "–") that signify not allocated.

The virtual volume creation program 2229, upon registering the virtual volume information, sends an end-report to the maintenance program 273 (S1605). The maintenance program 273 receives the end-report (S1606).

Next, the processing related to the above-described (TM2) will be explained.

According to the above-described (TM2), virtual volume creation is indicated only for the module 200 specified by the user. That is, according to FIG. 10, Step S1600 becomes unnecessary. Then, thereafter, a path is defined to this virtual volume 302 from the port 261 of the other module 200, and this triggers the creation of this virtual volume 302 in the other module 200. The processing related thereto will be explained hereinbelow using FIG. 11.

When the user indicates a path definition from the maintenance terminal 270, the maintenance program 273 of the maintenance terminal 270 and the path definition programs 2223 of the respective modules 200 are executed. The user, for example, specifies the port number of the port 261 to be used and the volume number of the target virtual volume 302 to the maintenance terminal 270.

The maintenance program 273 indicates a path definition to the module 200 having the specified port 261 (S200), and waits for an end-report from the indication-destination module 200 (S201). The maintenance program 273 notifies the module 200 of the port number of the port 261 to be used and the volume number of the target virtual volume 302 together with the path definition command.

The path definition program 2223, upon receiving the path definition command from the maintenance program 273 (S202), checks whether or not the virtual volume information of the target virtual volume (hereinafter, will be referred to as the "target virtual volume" in the explanation of FIG. 11) 302 has been registered in the virtual volume table 2212 (S203). As explained be referring to FIG. 10, the virtual volume information of the target virtual volume is registered in the virtual volume table 2212 in the user-specified module 200. If the virtual volume information of the target virtual volume has been registered (S203: YES), Step S204 is skipped. If the virtual volume information of the target virtual volume has not been registered (S203: NO), the path definition program 2223 registers this virtual volume information in the virtual volume table 2212 (S204). The contents of the virtual volume information registered at this point are substantially the same as the contents registered in Step S1604 of FIG. 10.

Figure 11:
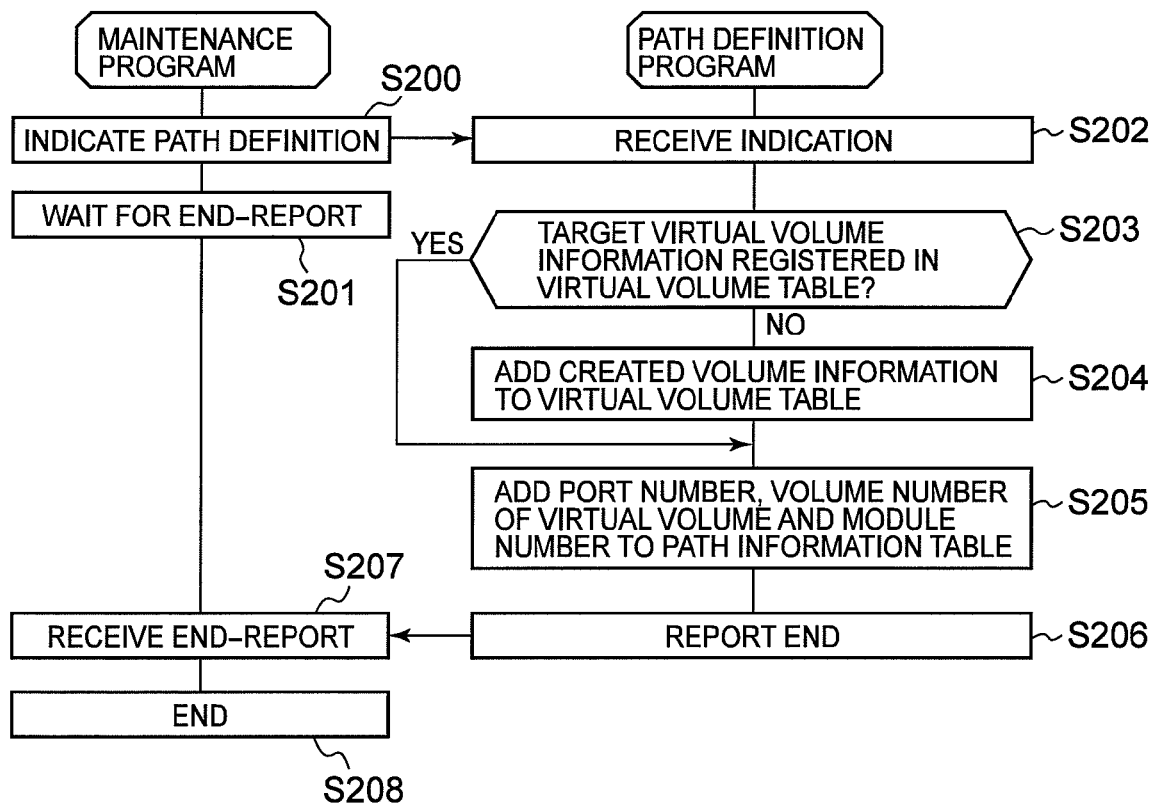
FIG. 11 is a diagram showing an example of a path definition process in the first embodiment.

Next, the path definition program 2223 registers in the path information table 2211 the port number of the specified port 261; the specified volume number; and the module number of the module, which this program 2223 is executing (for convenience sake, will be referred to as "the own module" in the explanation of FIG. 11) 200 (S205). Then, the path definition program 2223 reports end to the maintenance program 273 (S206).

The maintenance program 273 receives the end-report from the path definition program 2223 (S207), and ends processing (S208).

Furthermore, when a virtual volume 302 is created at path definition, there is the possibility that I/O processing is already being carried out with this virtual volume 302 by the other module 200. Thus, it is possible that a page 301 has been allocated to this virtual volume 302 by the other module 200. Therefore, at this time, the own module 200 queries the other module 200 as to the page allocation status vis-à-vis the virtual volume 302, and the own module 200 can register the query results in the virtual volume table 2212 of the own module 200. The own module 200 can query the other module 200 as to the page allocation status for the virtual area targeted for I/O in accordance with an I/O request at the point in time when the I/O request is received via the newly defined path.

Virtual volumes 302 can be created in the respective modules 200 as described hereinabove.

Figure 12:
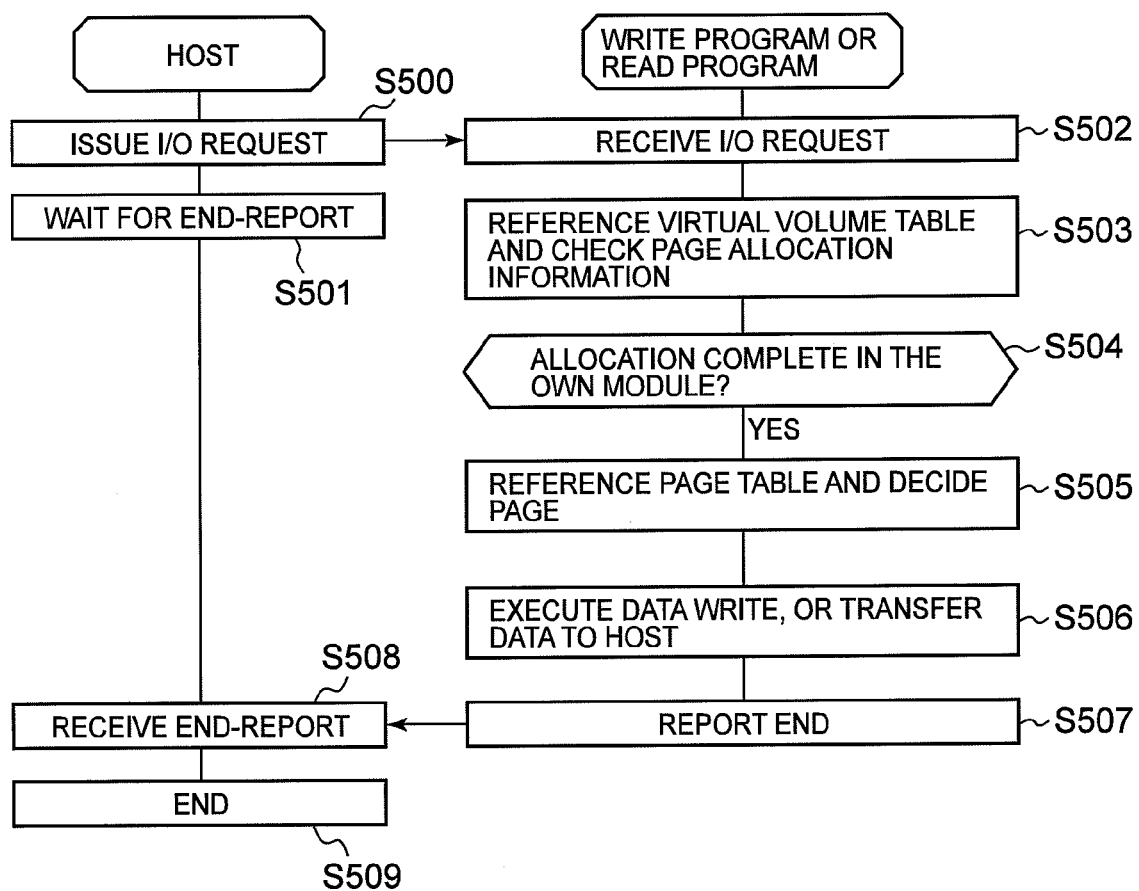
FIG. 12 is a diagram showing an example of a write process when the virtual area for which a page in the own module has been allocated is the write-targeted virtual area.
Figure 13:
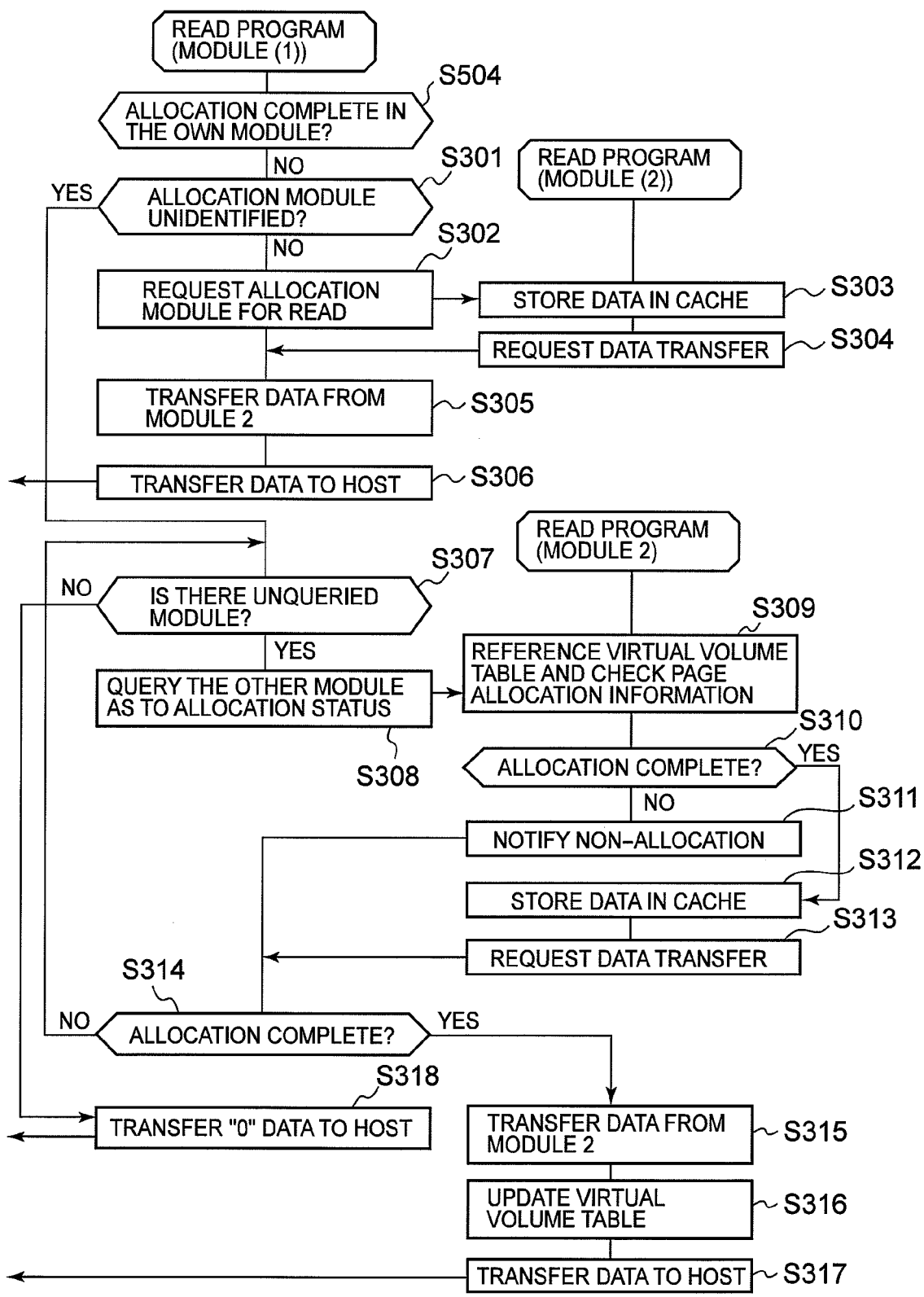
FIG. 13 is a diagram showing an example of a read process when a page in the own module has not been allocated to the read-targeted virtual area.
Figure 14:
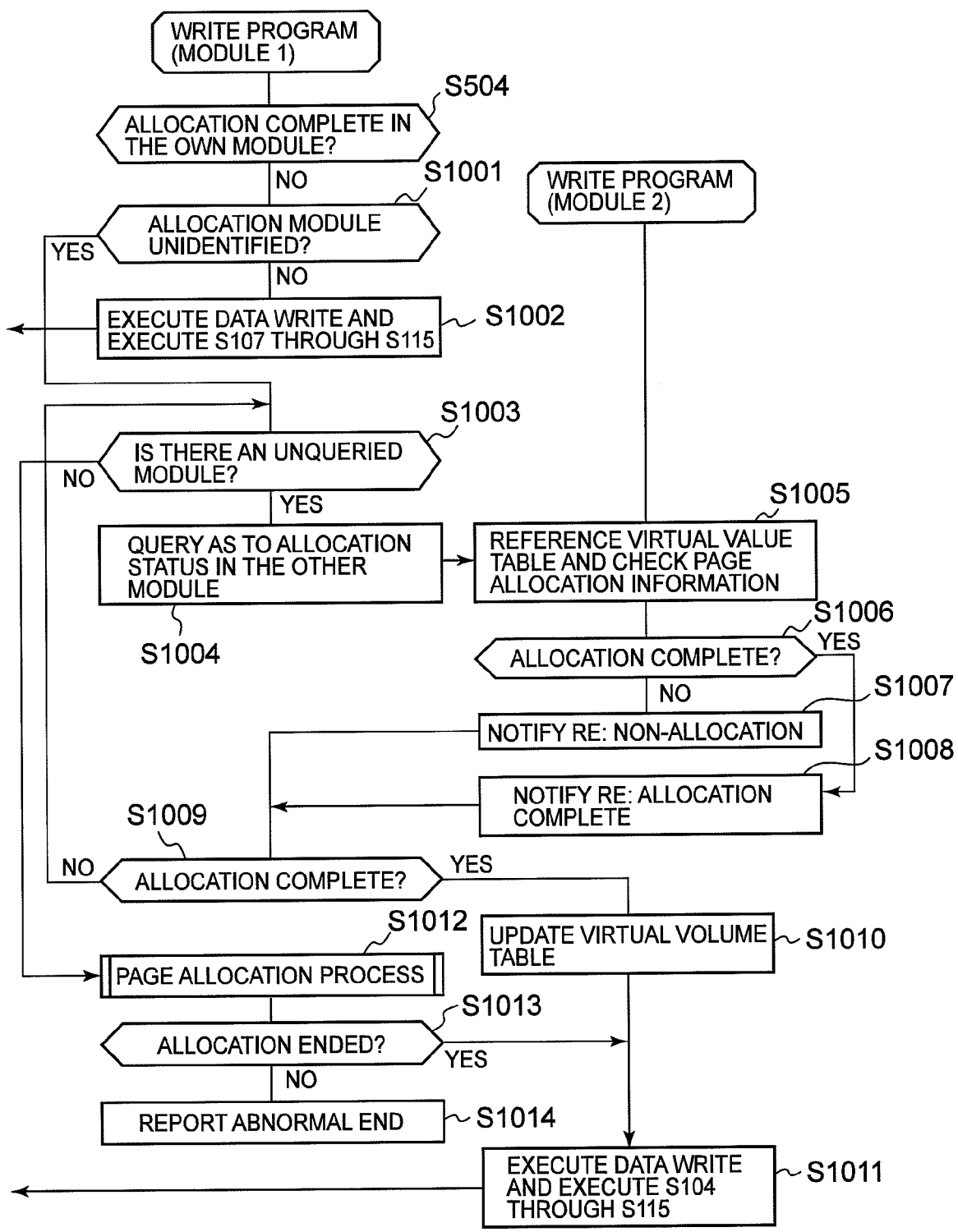
FIG. 14 is a diagram showing an example of a write process when a page in the own module has not been allocated to the write-targeted virtual area.
Figure 15:
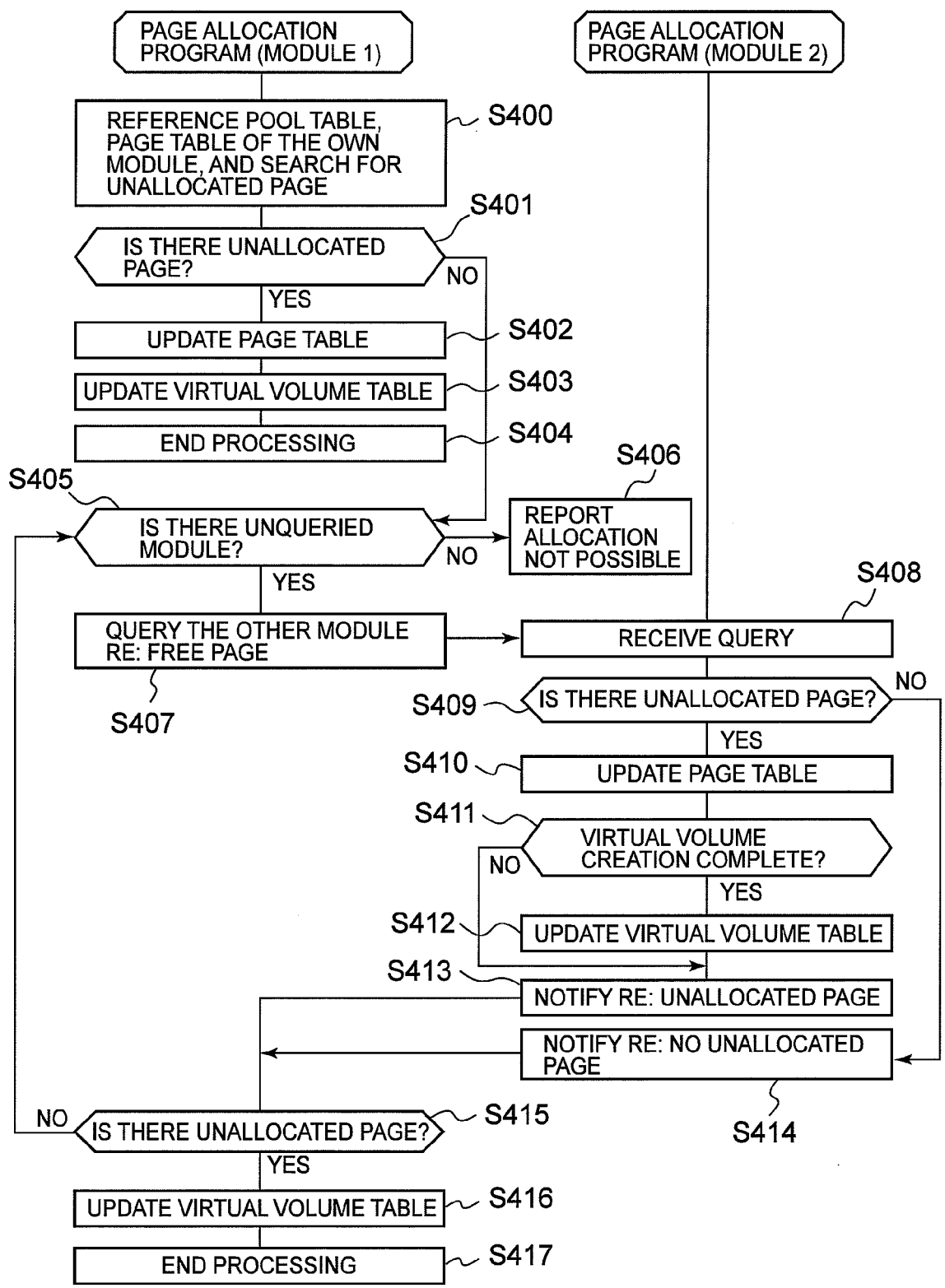
FIG. 15 is a diagram showing an example of the process for allocating a page to a virtual volume.

An example of I/O processing to a virtual volume 302 will be explained hereinbelow using FIGS. 12 through 15. Incidentally, FIG. 12 shows an example of I/O processing when a page 301 in the module (the own module) 200 that received the I/O request is allocated to the I/O-targeted virtual area. FIG. 13 shows an example of read processing when a page 301 in the own module 200 is not allocated to the read-targeted virtual area. FIG. 14 shows an example of write processing when a page 301 in the own module 200 is not allocated to the write-targeted virtual area. FIG. 15 shows an example of processing for allocating a page 301 to the virtual volume 302.

I/O processing when the virtual area, to which a page from inside the own module 200 has been allocated, is the I/O-targeted virtual area will be explained using FIG. 12. This I/O processing is realized by either the read program 2221 or the write program 2222 being executed. I/O processing will be explained hereinbelow using a write process as an example.

The host 100 issues a write request to the module 200 (S500), the waits for a write-end report from the module 200 (S501).

The write program 2222, upon receiving the write request (S502), checks the virtual volume table 3312 in the own module 200 (S504), and determines whether or not a page 301 from inside the own module 200 has been allocated to the write-targeted virtual area (S504). The example of FIG. 12 is write processing when a page 301 from inside the own module 200 has been allocated to the write-targeted virtual area. Thus, it is supposed that the determination of Step S504 will be "Yes". The processing when the determination of Step S504 is "No" will be explained using FIGS. 13 and 14.

Next, the write program 2222 references the page table 2214 and decides the address of the pool 300 into which the write-data will be written (that is, the write program 2222 specifies the page 301 allocated to the write-targeted virtual area) (S505). The write program 2222 writes the write-data to the decided address (page 301) (S506), and reports end to the host 100 (S507).

The host 100, upon receiving the end-report from the write program 2222 (S508), ends the processing (S509).

In the above explanation, a write process was used as the example, but in the case of a read process, for example, the following occurs. That is, in Step S502, a read request is received, and in Step S506, the read-data is read out from the allocation page 301, and this read-data is transferred to the host 100.

Next, read processing in a case in which a page 301 from inside the own module (the module that received the read request) 200 has not been allocated to the read-targeted virtual area in accordance with the read request will be explained using FIG. 13. In this case, it is possible that a page 301 in the other module 200 has been allocated to the read-targeted virtual area in the virtual volume 302 in this other module 200. The read processing of this case will be explained below by treating the own module 200 as module (1) and the other module 200 as module (2). Furthermore, the read processing is realized by executing the read programs 2221 in both module (1) and module (2).

When the determination of Step S504 is "No", read program (1) references virtual volume table (1) to determine whether or not the allocation module that corresponds to the read-targeted virtual area is unidentified (S301). If the value of the "page allocation status" for the read-targeted virtual volume is "allocated" and the value of the "allocation module" for the read-targeted virtual volume is the module number of the other module, the allocation module is identified. Conversely, if the value of the "page allocation status" for the read-targeted virtual volume is "not allocated" and the value of the "allocation module" for the read-targeted virtual volume is the value "–" signifying that there has been no allocation, the allocation module is unidentified.

When the allocation module is identified (S302: No), read program (1) requests that module (2), which is the allocation module, read the read-targeted virtual area (for example, notifies module (2) of the address of the read-targeted virtual area) (S302). Read program (2), which receives the data transfer request, specifies the page 301 allocated to the read-targeted virtual area by referencing virtual volume table (2), and stores the read-data from the specified page 301 in the read-out cache unit 223 (S303). Read program (2) issues a data transfer indication to module (1) (S304). Read program (2) notifies module (1) of the read-data cache address at this time. Read program (1), upon receiving the data transfer indication, transfers the data from module (2) (reads out the read-data from the cache area specified by the notified cache address) (S305). Next, read program (1) transfers the read-data to the host 100 (S306).

Conversely, when the allocation module is unidentified (S301: Yes), read program (1) determines whether or not there is a module 200 which has not been queried regarding page allocation status (S307). When an unqueried module 200 exists, read program (1) queries the relevant module 200 about the allocation status of page 301 (S308).

Read program (2) of module (2), which receives the page 301 allocation status query, references virtual volume table (2), checks the page allocation status (S309), and determines whether or not a page 301 from inside module (2) has been allocated to the read-targeted virtual area (S310). When a page 301 has not been allocated (S310: No), read program (2) notifies module (1) that there has been no allocation (S311). Conversely, when a page 301 has been allocated (S310: Yes), read program (2) stores the read-data in the cache unit 223 (S312), and issues an indication to module (1) to transfer the read-data (S313).

Read program (1), upon receiving a response from module (2), determines whether or not page allocation has been completed for module (2) (S314). When a page 301 in module (2) has not been allocated to the read-targeted virtual area (S314: No), read program (1) executes Step S307 for a different module 200. Conversely, when a page 301 in module (2) has been allocated to the read-targeted virtual area (S314: No), read program (1) transfers the read-data from module (2) to module (1) (S315), and updates the virtual volume table 2212 of module (1) (S316). More specifically, read program (1) changes the value of the "page allocation status" for the read-targeted virtual area to "allocated", and registers "module (2)" as the value of the "allocation module".

Next, read program (1) transfers the read-data transferred from module (2) to the host 100 (S317), and ends processing.

When the page-allocated module 200 remains unidentified and there are no unqueried modules 200 (S307: No), that is, when the read-targeted virtual area is a virtual area for which a page 301 has not been allocated from inside any module 200, the following processing is carried out.

In this case, read program (1) transfers, to the host 100, data signifying that data does not exist in the read-targeted virtual area, for example, data configured from a "0" (S318), and ends processing. Furthermore, in Step S318, an error can be transferred instead of the "0" data.

Next, FIGS. 14 and 15 will be used to explain a write process in a case in which a page 301 from inside the own module (the module that received a write request) 200 has not been allocated to the virtual area targeted for a write in accordance with the write request. Hereinafter, the explanation will treat the own module 200 as module (1), and will treat the other module 200 as module (2).

Write processing is realized by the write program 2222 and the page allocation program 2225 being executed by module (1) and module (2).

When the determination of Step S504 is "No", write program (1) references virtual volume table (1) and determines whether or not the allocation module for the write-targeted virtual area is unidentified (S1001). Furthermore, the definition of unidentified is the same as that of the read process explained by referring to FIG. 13.

When the allocation module is identified (S1001: Yes), the write-data is transferred to and stored in the other module (2) (S1002). That is, in Step S1002, Steps S107 through S115 of FIG. 4 are carried out.

When the allocation module is unidentified (S1001: No), write program (1) determines whether or not there is a module 200 that has not been queried regarding the page allocation status of the write-targeted virtual area (S1003). When an unqueried module 200 exists, write program (1) queries the unqueried other module 200 regarding page allocation status (S1004).

Write program (2) of module (2), which receives the page allocation status query, checks the page allocation status by referencing virtual volume table (2) (S1005), and determines whether or not a page 301 from inside module (2) has been allocated to the write-targeted virtual area (S1006). When a page 301 has not been allocated (S1006: No), write program (2) notifies module (1) that there has been no allocation (S1007). Conversely, when a page 301 has been allocated (S1006: Yes), write program (2) notifies module (1) that allocation is complete (S1008).

Write program (1), upon receiving a response from module (2), determines whether or not page allocation has been completed in module (2) (S1009). When a page has not been allocated in module (2) (S1009: No), write program (1) executes Step S1003 for the other module 200. Conversely, when page allocation has been completed in module (2) (S1009: Yes), write program (1) updates virtual volume table (1) (S1010). Thereafter, the write-data is transferred to and stored in the other module (2) (S1011). That is, Steps S104 through S115 of FIG. 4 are executed. Furthermore, unlike Step S1002, the reason for also executing Steps S104 through S106 is because a new page 301 could be allocated in Step S1012. More specifically, this is because, when a page 301 from inside module (1) is allocated in Step S1012, write program (1) has to write the write-data to the page 301 from inside the own module (1). Further, the update of the virtual volume table 2212 in Step S1010 is the same as for the read process, and the value of the "page allocation status" of the virtual volume table 2212 is updated to "allocated" and "module (2)" is registered as the value of the "allocation module" for the write-targeted virtual area.

When the page-allocated module 200 remains unidentified and there are no unqueried modules 200 (S1003: No), write program (1) runs page allocation program (1) and executes a page allocation process (S1012). Next, write program (1) determines whether or not page allocation has been completed (S1013). When the determination result is that a page 301 has been newly allocated (S1013: Yes), write program (1) stores the write-data in the allocated page 301 (S1011). Conversely, when a page 301 has not been allocated due to a shortage of free capacity in the pool 300 in module (1) (a shortage of unallocated pages 301) or the like (S1013: No), write program (1) notifies the host 100 of an abnormal end (S1014), and ends processing.

Step S1012 (the page allocation process) will be explained in detail using FIG. 15.

Page allocation program (1) searches for an unallocated page by referencing pool table (1) and page table (1) (S400). Then, page allocation program (1) determines whether or not an unallocated page exists in the pool 300 in module (1) (S401).

When an unallocated page exists in module (1) (S401: Yes), page allocation program (1) updates page table (1) and virtual volume table (1) (S402 and S403), and ends processing (S404). More specifically, page allocation program (1) changes the value of "status" in page table (1) to "allocated", and changes the value of "allocation destination" to the virtual volume number of the target virtual volume for the page 301 to be allocated. Further, for the write-targeted virtual area, page allocation program (1) changes the value of "page allocation status" of the virtual volume table 2212 to "allocated", registers "module (1)" as the "allocation module", registers the pool number of the pool 300 to which the allocated page 301 belongs as the value of "pool number", and registers the page number of the allocated page 301 as the value of "page number".

Conversely, when there are no unallocated pages in module (1) (S401: No), page allocation program (1) determines whether or not there is a module 200 which has not been queried about unallocated pages (S405). When an unqueried module 200 exists, page allocation program (1) queries the relevant module 200 as to the presence of an unallocated page (S407).

Page allocation program (2) of the other module (2), which receives the query, receives the query regarding the presence of an unallocated page (S408), references pool table (2) and page table (2), searches for an unallocated page, and determines whether or not an unallocated page exists in the pool 300 in module (2) (S409).

When an unallocated page exists (S409: Yes), page allocation program (2) updates page table (2) (More specifically, page allocation program (2) changes the value of "status" in page table (2) to "allocated" for the page to be allocated.) (S410).

Next, page allocation program (2) determines whether or not a page allocation-destination virtual volume 302 has been created in module (2) (S411). When virtual volume information related to a page allocation-destination virtual volume 302 exists in virtual volume table (2), the result of this determination is that the page allocation-destination virtual volume 302 has been created, and when this information does not exist, the determination result is that this virtual volume 302 has not been created. In a case (the case of the above-described (TM1)) in which the user creates a volume 302, and this triggers the creation of virtual volumes 302 in all the modules 200, a virtual volume 302 is created in module (2). Furthermore, in a case (the case of the above-described (TM2)) in which a path definition triggers the creation of a virtual volume 302, a virtual volume 302 has been created if a path to the relevant virtual volume 302 in module (2) has been defined.

When a virtual volume 302 has been created (S411: Yes), page allocation program (2) updates virtual volume table (2) (S412). More specifically, the value of "page allocation status" in virtual volume table (2) is updated to "allocated", "module (2)" is registered as the value of "allocation module", the pool number of the pool 300 to which the page 301 allocated to the write-targeted virtual area belongs is registered as the value of "pool number", and the page number of this page 301 is registered as the value of "page number" for the write-targeted virtual area. Conversely, when a virtual volume 302 has not been created (S411: No), Step S412 is skipped. Page allocation program (2) reports the existence of an unallocated page to module (1) (S413).

By updating virtual volume table (2) beforehand as described hereinabove, it is possible to determine the page allocation status of the virtual area without communicating with module (1) when module (2) receives from the host 100 an I/O request that specifies the allocation destination of this page 301 as the I/O target.

Now then, when there are no unallocated pages in Step S409 (S409: No), page allocation program (2) reports to module (1) that an unallocated page does not exist (S414).

Page allocation program (1) of module (1), which receives the report from module (2), determines whether or not an unallocated page exists in module (2) (S415).

When an unallocated page exists in module (2) (S415: Yes), page allocation program (1) changes virtual volume table (1) (S416), and ends processing (S417). More specifically, the value of "page allocation status" is changed to "allocated" in virtual volume table (1), and "module (2)" is registered as the value of "allocation module" for the write-targeted area. By contrast, when there are no unallocated pages in module (2) (S415: No), page allocation program (1) executes Step S405 for a different module 200.

When the module 200 having an unallocated page remains unidentified and there are no unqueried modules 200 (S405: No), page allocation program (1) reports to write program (1), which called page allocation program (1), that allocation is not possible (S406).

As described hereinabove, it is possible to realize write or read processing for a virtual area to which a page 301 from inside the own module 200 has not been allocated.

According to the above explanation, module (2) comprises virtual volume (2) to which is allocated the same volume number as the volume number allocated to virtual volume (1) of module (1). Module (2), upon receiving from the host 100 a write request that has an unallocated-page virtual area as the write-targeted virtual area, allocates a page from inside module (2) to the write-targeted virtual area, and writes the write-data to this page. Further, when module (2) receives from the host 100 a read request that has this virtual area as the read-targeted virtual area, module (2) reads out the read-data from the page in module (2), and transfers this data to the host 100. Therefore, in a case like this, inter-module communications do not occur.

Second Embodiment

A second embodiment of the present invention will be explained hereinbelow. In so doing, the points of difference with the first embodiment will mainly be explained, and explanations of the points in common with the first embodiment will be either simplified or omitted.

In the first embodiment, for example, inter-module communications occur when a page 301 from inside the other module (1) is allocated to a read-targeted virtual area in accordance with a read request received by the own module (2).

Accordingly, the second embodiment makes it possible to reduce cases in which inter-module communications occur by replicating among the modules the data that is stored in a page 301. More specifically, for example, data, which is stored in a page 301 in module (1) but which is not stored in a page 301 in module (2), is replicated from the page in module (1) to a page in module (2). In this case, the page in module (1) is the replication-source page, and the page in module (2) is the replication-destination page.

Figure 16:
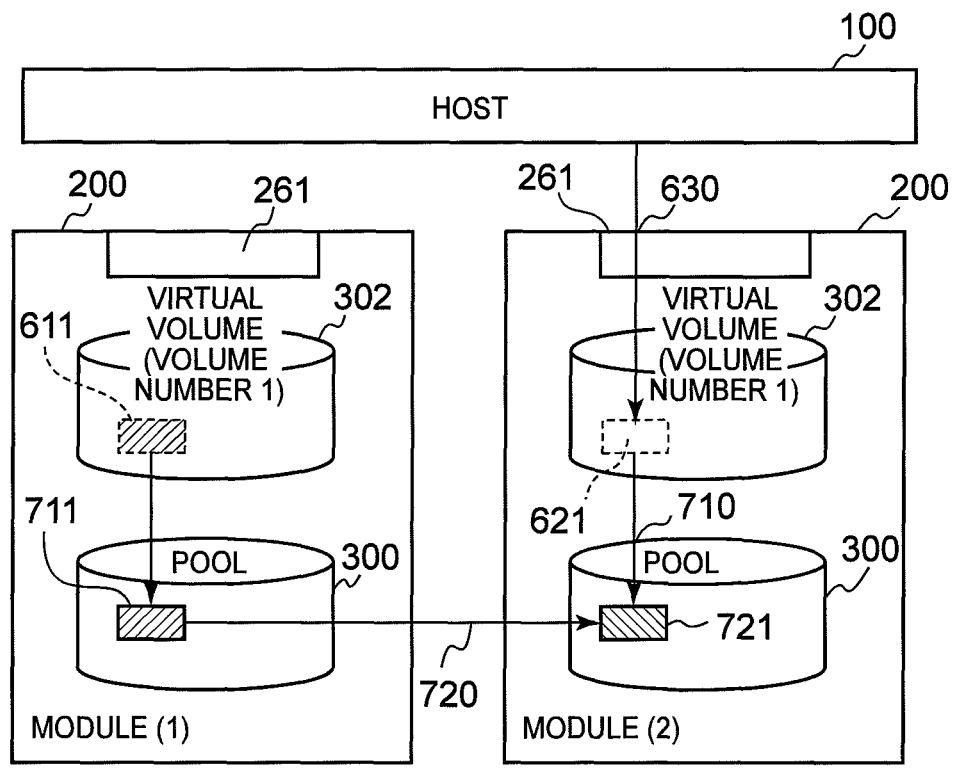
FIG. 16 is a schematic diagram of an overview of one characteristic feature of a second embodiment.

Even more specifically, as shown in FIG. 16 for example, data, which is stored in the page 711 allocated to the first virtual area 611 of virtual volume (1), does not exist in module (2). In this second embodiment, this data stored in page 711 is replicated to an unallocated page 721 in module (2) as indicated by arrow 720. The page 721 is allocated to the first virtual area 621 of virtual volume (2). Consequently, module (2), upon receiving a read request in which the first virtual area 621 is the read-targeted area as indicated by arrow 630, can read out the read-data from the page 721 in module (2) and transfer this data to the host 100. That is, inter-module communications do not occur. Hereinafter, inter-module replication of data stored in a page will be referred to as "page replication". Further, data that has been replicated will be referred to as "replicated data", and a page in which replicated data is stored will be referred to as a "replicated page".

FIG. 17 explains an example of a virtual volume table of the second embodiment.

According to the virtual volume table 22121, replicated bit, replication module and read frequency are also registered for each virtual area in addition to the virtual volume number, address, page allocation status, allocation module, pool number and page number. The "replicated bit" shows whether or not data stored in a page (the page specified by the values of the "pool number" and "page number" corresponding to the target virtual area) 301 allocated to the target virtual area has been replicated in the other module 200. The "replication module" is the module number of the module 200 having a replica of the data stored in this page 301. The "read frequency" shows the frequency of read requests (the number times read requests are received per unit of time) from the host 100 to this page 301.

If it is supposed that the table shown in FIG. 17 is the virtual volume table in module (1), the following is clear from the table shown in FIG. 17. For example, it is clear that initially a page from in module (2) has been allocated to the virtual area corresponding to the address "0 through 99", and that thereafter page replication has been carried out from module (2) to module (1). It is also clear that the read frequency corresponding to the virtual area corresponding to the address "0 through 99" is 1000 time per second. Furthermore, the value of the "read frequency" in the table shown in FIG. 17, for example, is updated by read program (1). Read program (1) can count the number of times a read request is received per unit of time for each first virtual area, and can update the value of the "read frequency" corresponding to the respective first virtual areas in a timely fashion.

The advantages of adding the read frequency will be explained. For example, as shown in FIG. 16, it is supposed that page 711 in module (1) is allocated to first virtual area 611 in virtual volume (1), and that page 721 in module (2), in which a replica of the data stored in page 711 is stored, is allocated to first virtual area 621 in virtual volume (2). If the data stored in page 721 is not updated here despite the fact that the data stored in page 711 has been updated, the data stored in page 721 will constitute old content data. Thus, when module (2) receives a read request that has the first virtual area as the read-targeted virtual area, old data will be transferred to the host 100. To prevent this, the correspondent data in first virtual areas 611 and 621 must be constantly synchronized. However, doing so requires that both virtual areas 611 and 621 be updated when updating the data of a virtual area, resulting in the occurrence of inter-module communications. Accordingly, if the read frequency is registered for each virtual area as shown in FIG. 17, for example, page replication can be carried out only for the page allocated to the virtual area for which read frequency is high.

Furthermore, a high read frequency is a read frequency that is higher than a reference value. Here, the "reference value" can be a predetermined value, or a value based on the write frequency. The write frequency for the respective virtual areas is the number of times per unit of time that write requests targeted at the relevant virtual area are received. For example, when the read frequency is higher than the write frequency for one virtual area, or when the read frequency is higher than a value achieved by multiplying a prescribed coefficient by the write frequency, it can be treated as a "high read frequency". The write frequency, for example, can be registered in the virtual volume table 22121 the same as the read frequency.

The trigger and conditions for executing page replication, the trigger and conditions for deleting a replicated page, and a write process will be explained hereinbelow. A write processing method that exercises control such that old data is not referenced will be described in detail.

Firstly, as the trigger for executing page replication, (a) a path definition trigger, and (b) an I/O processing trigger are conceivable. For the I/O processing trigger, the following cases (b1) and (b2) are considered.

(b1) is a case in which page replication is carried out from the other module 200 to the own module 200 when an I/O is generated to a page 301 in the other module 200.

(b2) is a case in which page replication is carried out from the own module 200 to the other module 200 when an I/O is generated to a page 301 in the own module 200. Further, a case in which page replication is executed by a maintenance operation trigger, and a case in which the storage system regularly carries out page replication are also conceivable.

Figure 18:
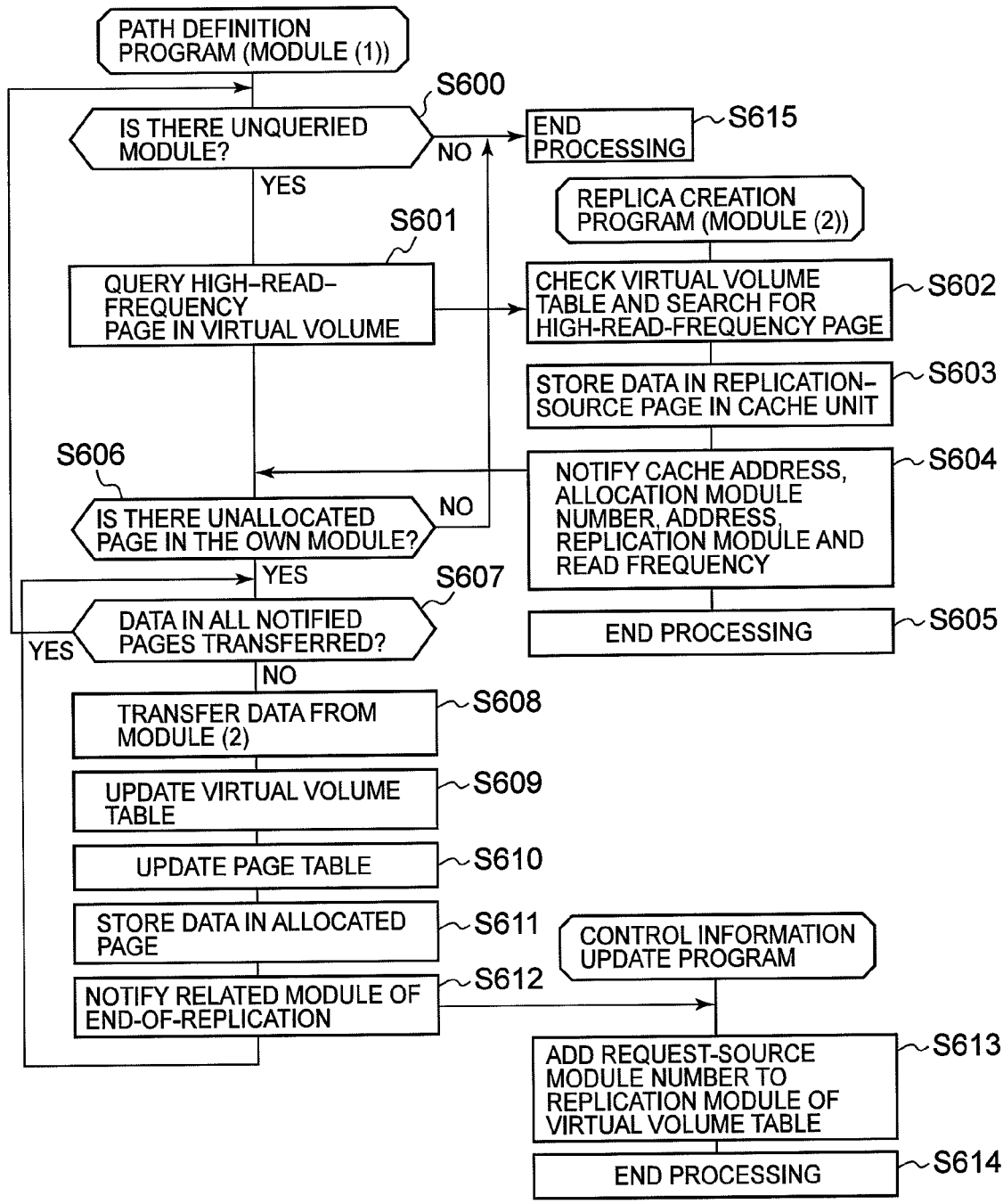
FIG. 18 is a diagram showing an example of a page replication process when a path is defined.

FIG. 18 will be used to explain an example of a page replication process for replicating data stored in a page 301 allocated by module (2) at path definition time to module (1), which is implementing the path definition.

This process is realized as follows. For example, the path definition program 2223 is executed in module (1). The replica creation program 2226 is executed in module (2). Further, the control information update program 2228 is executed in all the modules having a replicated page that corresponds to the replication-source page on FIG. 18.

For example, immediately subsequent to Step S205 shown in FIG. 11, the path definition program 2223 determines whether or not there is a module 200 that has not been queried as to whether or not the module 200 has a page 301 capable of being the replication-source (S600). When all the modules 200 have been queried (S600: No), the path definition program 2223 ends processing (S615).

When there is a module 200 that has not been queried (S600: Yes), the path definition program 2223 queries this module 200 (module (2)) as to the presence or absence of a page 301 allocated to the path definition-targeted volume, and, in addition, as to the presence or absence of a page (high-read-frequency page) 301 allocated to a virtual area having a high read frequency (S601). Furthermore, the path definition program 2223 notifies module (2) of the volume number of the path definition-targeted virtual volume 302 together with this query.

The replica creation program 2226 receives the query, and searches for a high-read-frequency page by checking virtual volume table (2) (S602). Next, the replica creation program 2226 decides the replication-source page 301 (for example, decides that the page retrieved in Step S602 is the replication-source page 301), and stores the data stored in this replication-source page 301 in cache unit (2) (S603). Then, the replica creation program 2226 notifies module (1) of the cache address of this data, the value of the "allocation module" corresponding to the virtual area to which the replication-source page 301 has been allocated, the "address" value, the "replication module" value, and the "read frequency" value (S604), and ends processing (S605). Furthermore, when there is no replication-source page 301, the replica creation program 2226, for example, notifies module (1) that a replication-source page 301 did not exist in Step S604.

The path definition program 2223 of module (1), which receives the module (2) report, makes a determination as to whether or not an unallocated page 301 exists in module (1) (S606). When there are no unallocated pages 301 in module (1) (S606: No), the path definition program 2223 ends processing (S615).

When an unallocated page 301 exists in module (1) (S606: Yes), the path definition program 2223 makes a determination as to whether or not all the data transfers (that is, page replications) from the replication-source pages 301 in module (2) have been completed (S607). Then, when the data stored in all the replication-source pages 301 has been transferred to module (1) (S607: Yes), the path definition program 2223 carries out Step S600 for a different module 200.

Conversely, when data has not been transferred to module (1) from a portion of the pages 301 of the replication-source pages 301 in module (2) (S607: No), the path definition program 2223 transfers (reads out the data) data from one page 301 of the replication-source pages 301 in module (2) to module (1) (S608). Next, the path definition program 2223 allocates an unallocated page (replication-destination page) 301 to the target virtual area (virtual area corresponding to the value of the "address" that was notified from module (2)) by updating page table (1) and virtual volume table (1) (S609 and S610). More specifically, the path definition program 2223 changes the "status" of the replication-destination page in page table (1) to "allocated", and changes the "allocation destination" value to the virtual volume number of the target virtual volume. Furthermore, the path definition program 2223 changes the "page allocation status" of the target virtual area in virtual volume table (1) to "allocated", changes the "allocation module" value to "module (2)", sets the "pool number" value as the pool number of the pool to which the above-mentioned selected page 301 belongs, sets "replicated bit" to "ON", sets the "replication module" value as "module (1)", and changes the "read frequency" value to the value of the read frequency notified from module (2).

Next, the path definition program 2223 stores a replica of the data stored in the replication-source page 301 (replicated data), which has been transferred from module (2), in the allocated replication-destination page 301 (S611). Then, the path definition program 2223 notifies all the modules (except module (1)) that have a replication page corresponding to the replication-source page of FIG. 18 of the fact (for example, the numbers of the target virtual area address and module (1)) that module (1) has been added as the "replication module" for the allocation-destination virtual area of the replication-destination page 301 (S612).

The path definition program 2223 also carries out page replication for other replication-source pages 301 by repeatedly executing Steps S607 through S612.

The control information update program 2228 in the module 200 that receives the notification of Step S612 updates the virtual volume table 22121 in this module 200 (S613), and ends processing (S614). More specifically, the control information update program 2228 adds "module (1)" as the value of the "replication module" for the virtual area specified by the notified address. Therefore, for example, when there are three or more modules 200, a plurality of values (module numbers) may be registered as the "replication module" value corresponding to one virtual area.

As described hereinabove, it is possible for the definition of a path in module (1) to trigger the creation in module (1) of a replica of the data stored in a page 301 already allocated by module (2) to the path definition-targeted virtual volume 302. Furthermore, the fact that module (1) has been added anew as the "replication module" is notified to all the modules 200 that already have replicated data for the target virtual area. Consequently, the respective modules 200 possessing replicated data can recognize where replicated data has been created. This information, for example, is used in processing for synchronizing the pages 301 of the respective modules 200 at the time of a write process (this processing will be explained below using FIGS. 24 and 25).

Next, an example of processing for carrying out page replication from the other module to the own module when an I/O is generated in a page 301 of the other module will be explained using FIGS. 19 and 20. This processing replicates data written to a page allocated to the I/O targeted virtual area in the own module from the relevant page in the other module when a module-spanning I/O is carried out.

Figure 19:
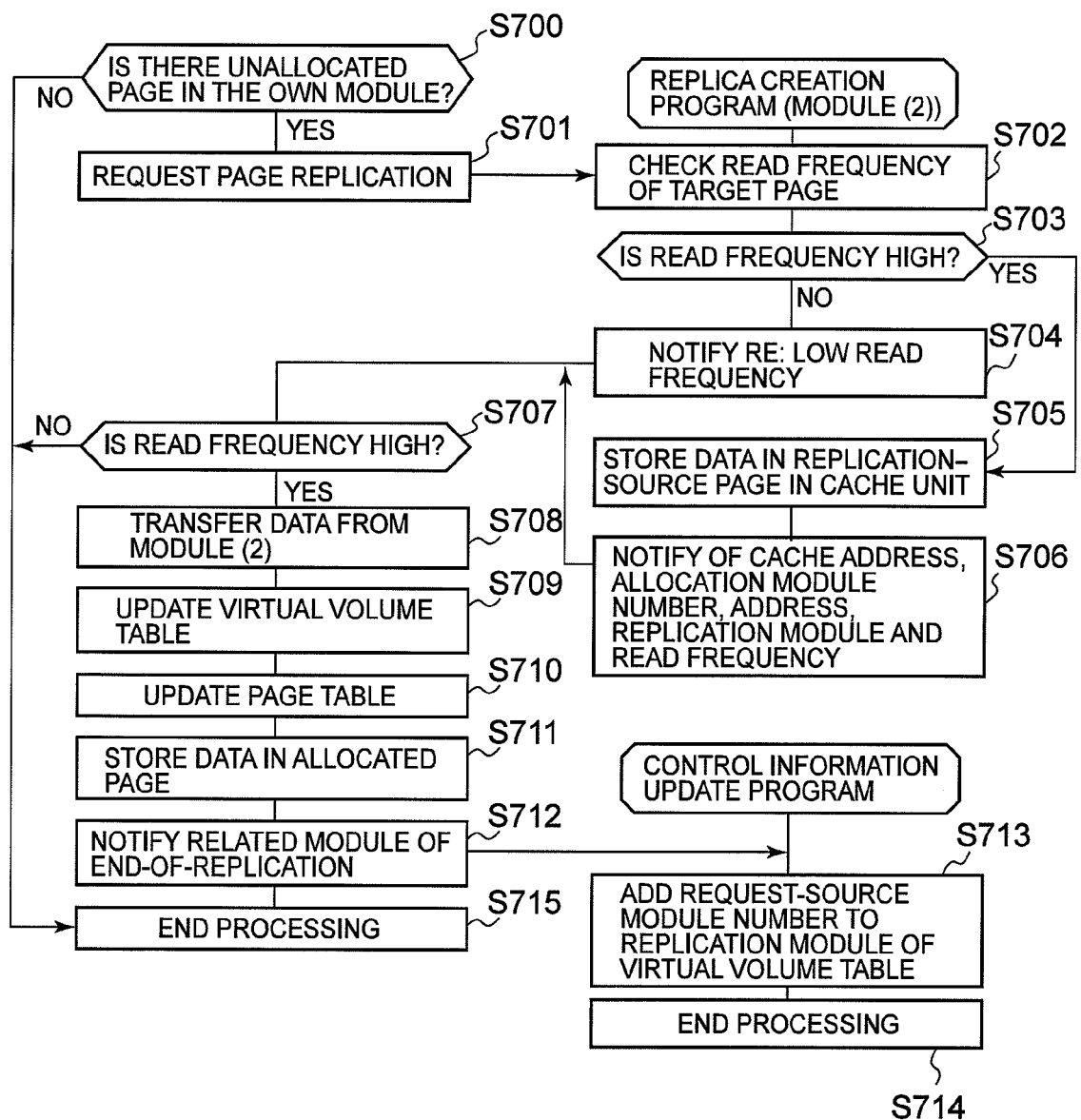
FIG. 19 is a diagram showing an example of page replication processing during a write process.
Figure 20:
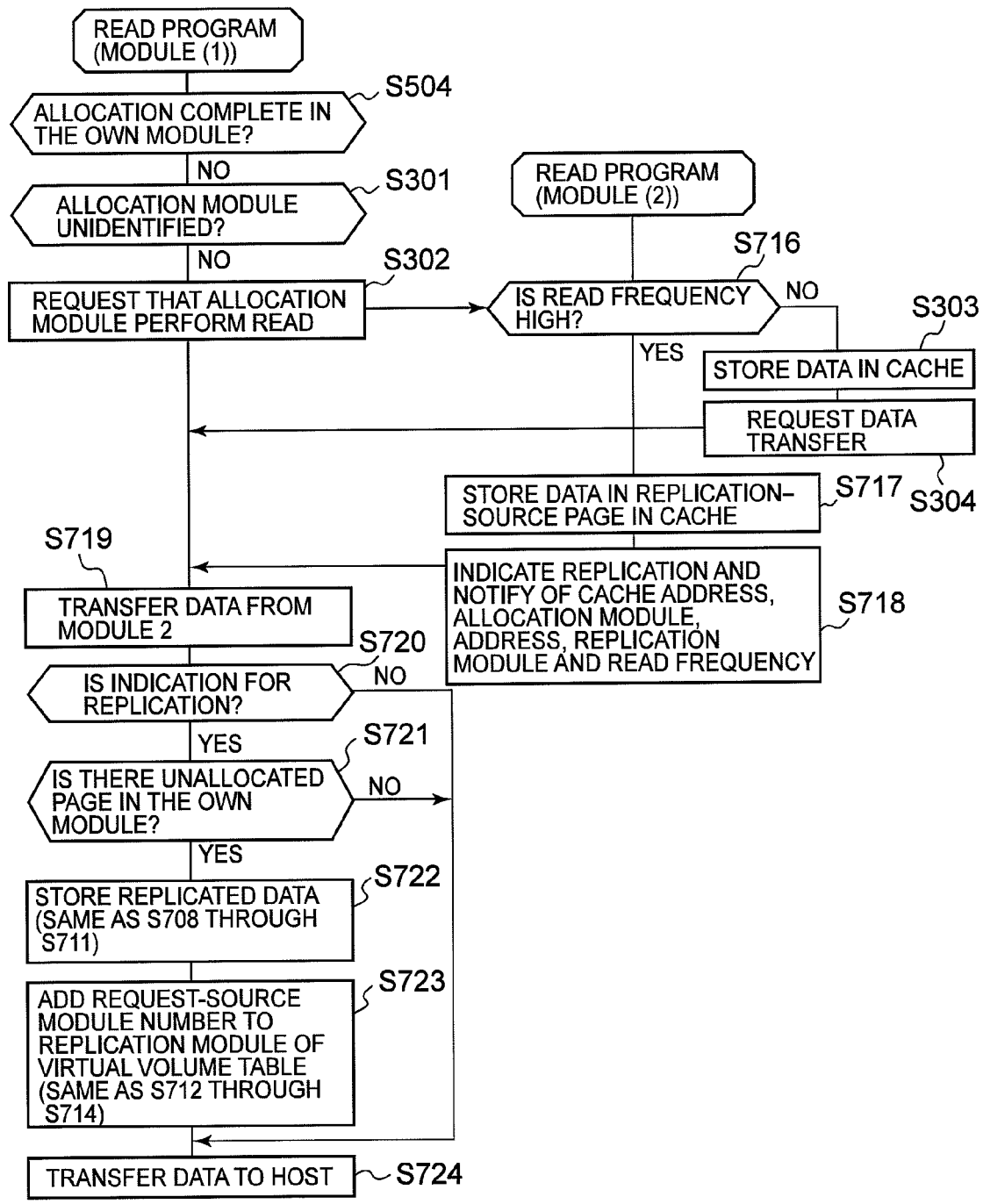
FIG. 20 is a diagram showing an example of page replication processing during a read process.

FIG. 19 is an example of a page replication process at the time of a write process, and FIG. 20 is an example of a page replication process at the time of a read process.

The processing shown in FIG. 19, for example, is realized as follows. The write program 2222 is executed in module (1). The replica creation program 2226 is executed in module (2). The control information update program 2228 is executed in all the modules having a replicated page corresponding to the replication-source page of FIG. 19.

For example, in S1011 of FIG. 14, subsequent to module (1) storing write data in the page 301 in module (2), the write program 2222 of module (1) determines whether or not there is an unallocated page 301 in module (1) (S700). When an unallocated page 301 does not exist in module (1), the processing is ended since there is no page 301 for storing the replicated data (S715).

When an unallocated page 301 exists in module (1), the write program 2222 requests that module (2) replicate the data that is in the page allocated to the write-targeted virtual area (S701).

The replica creation program 2226 of module (2), which receives the replication request, references virtual volume table (2), checks the read frequency of the write-targeted virtual area (S702), and determines whether or not the read frequency is high (S703). When the read frequency is low, the replica creation program 2226 notifies module (1) that the read frequency is low (S704), and ends processing. Then, the write program 2222 of module (1) receives the notification that the read frequency is low (S707: No), and ends processing (S715).

Conversely, when the read frequency of the write-targeted virtual area is high (hereinafter, will be referred to as the "high-read-frequency virtual area" in FIG. 19) (S703: Yes), the replica creation program 2226 stores the data in the page allocated to the high-read-frequency virtual area to cache unit (2) (S705). Then, the replica creation program 2226 notifies module (1) of the cache address of this data, the value of the "allocation module" for the virtual area to which the replication-source page 301 is allocated, the "address" value, the "replication module" value, and the "read frequency" value (S706), and ends processing.

The write program 2222 of module (1), which receives the report from module (2), transfers the data stored in the replication-source page allocated to the high-read-frequency virtual area from module (2) to module (1) (S708). Then, the write program 2222 allocates an unallocated page 301 in module (1), and stores the transferred data in this allocated page 301 (S709 through S711). Next, the write program 2222 notifies all the modules (except module (1)) that have replicated pages corresponding to the replication-source page of FIG. 19 of the fact (for example, the number of the address of the target virtual area and module (1)) that module (1) has been added as the "replication module" for the allocation-destination virtual area of the replication-destination page 301 (S712), and ends processing (S715). The respective modules 200, which receive this notification, update the virtual volume table 22121 in the own module (S713), and end processing (S714). The processing contents of Steps S708 through S714 are the same as those of Steps S608 through S614 of FIG. 18.

Furthermore, in the page replication processing at the time of a write process shown in FIG. 19, module (2) decides whether or not to make the page 301 allocated to the target virtual area the replication source based on the value of the target virtual area read frequency stored in virtual volume table (2). However, module (1), which requests the replication of page 301, can decide whether or not to make the page 301 allocated to the target virtual area the replication source in module (2) based on the value of the target virtual area read frequency stored in virtual volume table (1). Furthermore, module (1) can also decide whether or not to make the page 301 allocated to the target virtual area the replication source in module (2) based on the values of the read frequencies of both module (1) and module (2) for the target virtual area.

Page replication processing at the time of a read process that spans the modules 200 will be explained. This page replication process can be realized using the same processing steps as those of page replication processing at the time of a write process. For example, this processing can be realized by adding the processing for creating a replica shown in FIG. 19 (Steps S700 through S715) between Steps S316 and S317 of the read process that spans the modules 200 shown in FIG. 13.

FIG. 20 will be used to explain a different page replication process at the time of a read process. Because the read process differs from the write process and the data is transferred to the host 100, the read data has to be transferred from the other module (2) to the own module (1). A page replication process at the time of a read process can be improved by using this transfer. More specifically, for example, when the read data is stored in a high-read-frequency page 301, the read data is not only transferred from the other module (2) to the own module (1), but also, the own module (1) stores the read data from module (2) in a free page 301 in module (1). Consequently, it is possible to reduce the number of inter-module communications required in the page replication process.

The processing shown in FIG. 20, for example, is realized as follows. The read program 2221 is executed in modules (1) and (2). The control information update program 2228 is executed in module (2).

This processing can also be realized by changing the read process that spans the modules 200 shown in FIG. 13. Furthermore, in a case in which the result of Step S504 is "Yes", replication is not required since page allocation has been completed by module (1). Accordingly, the explanation will be omitted (The explanation was completed using FIG. 13). In a case in which the result of Step S301 is "Yes", it is possible to apply the page replication process, which will be explained hereinbelow, but since this processing is the same as when the result of Step S301 is "No", this explanation will be omitted.

Read program (1) recognizes that module (2) has read data by executing Steps S504 and S301. Next, read program (1) issues a read request to module (2) (S302).

Read program (2) of module (2), which receives the read request from module (1), checks the read frequency of the allocation-destination virtual area of the page 301 that will store the read data, and determines whether or not the read frequency is high (S716). When the read frequency is low, module (2) executes the processing that was explained using FIG. 13 (S303 and S304).

Conversely, when the read frequency is high, read program (2) reads out all the data in the page that is allocated to the virtual area with the high read frequency, and stores this data in cache unit (2) (S717).

Then, read program (2) issues a page replication indication to module (1) (S718), and ends processing. At this time, the cache address of the transferred data in the replication-source page 301, the value of the "allocation module" that corresponds to the allocation-destination virtual area of the replication-source page 301, the "address" value, the "replication module" value, and the "read frequency" value are notified to module (1) by read program (2).

Read program (1) of module (1), which receives the above-mentioned notification from module (2), transfers the data that is in the cache area denoted by the notified cache address to module (1) from module (2) (S719). Next, read program (1) determines whether or not the notification from module (2) is a page replication indication (S720). When this notification is not a page replication indication (S720: No), read program (1) transfers the read data transferred from module (2) to the host 100, and ends processing (S724).

Conversely, when the notification is a page replication indication (S720: Yes), read program (1) makes a determination as to whether or not there is an unallocated page 301 in module (1) (S721). When there is no unallocated page 301 in module (1) (S721: No), Step S724 is carried out. When an unallocated page 301 exists in module (1) (S721: Yes), read program (1) allocates the unallocated page 301 in module (1), and stores the transferred data in this allocated page 301 (S722). Next, read program (1) notifies all the modules (except module (1)) having replicated pages corresponding to the replication-source page of FIG. 20 that module (1) has been added to "replication module". The respective modules 200 that receive this notification update the virtual volume table 22121 in the own module 200 (add "module (1)" as the value of "replication module"), and end processing (S723). The processing of Step S722 is the same as Steps S708 through S711 of FIG. 19. Furthermore, the processing of Step S723 is the same as Steps S712 through S714 of FIG. 19. Read program (1), subsequent to executing Step S723, transfers the read data to the host 100, and ends processing (S724).

Furthermore, when the result of Step S301 is "Yes", the page replication process can be carried out by changing Steps S312 and S313 to Steps S716 through S718, and changing Steps S315 and S316 to Steps S719 through S724.

Figure 21:
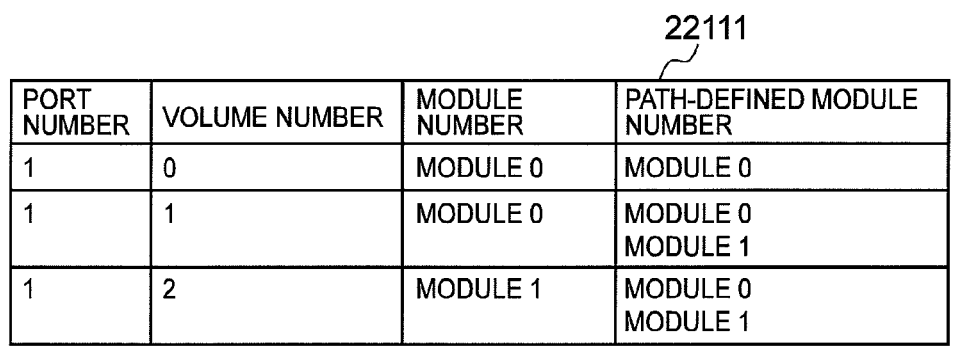
FIG. 21 is a diagram showing an example of a path information table in the second embodiment.
Figure 22:
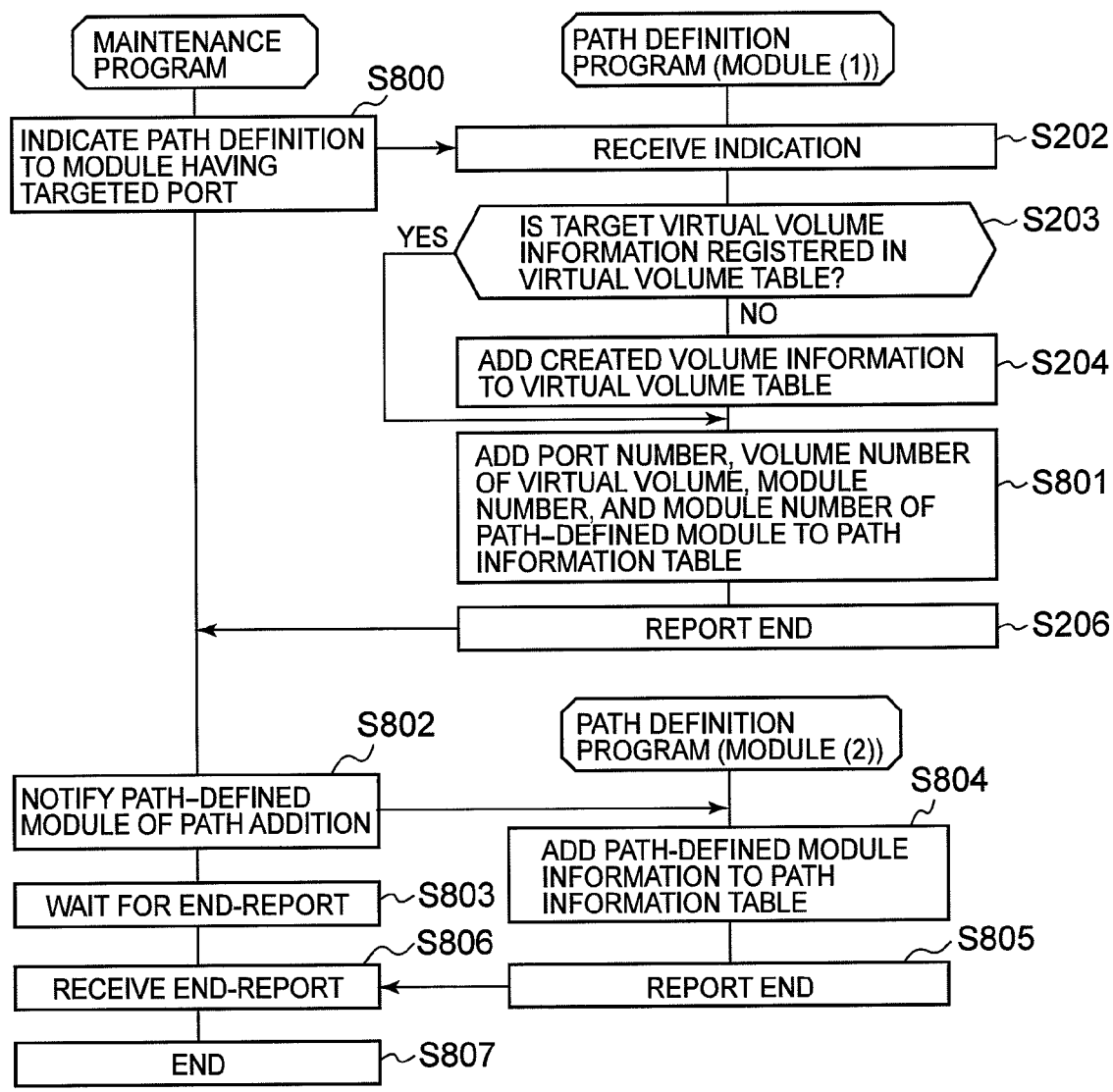
FIG. 22 is a diagram showing an example of a path definition process in the second embodiment.
Figure 23:
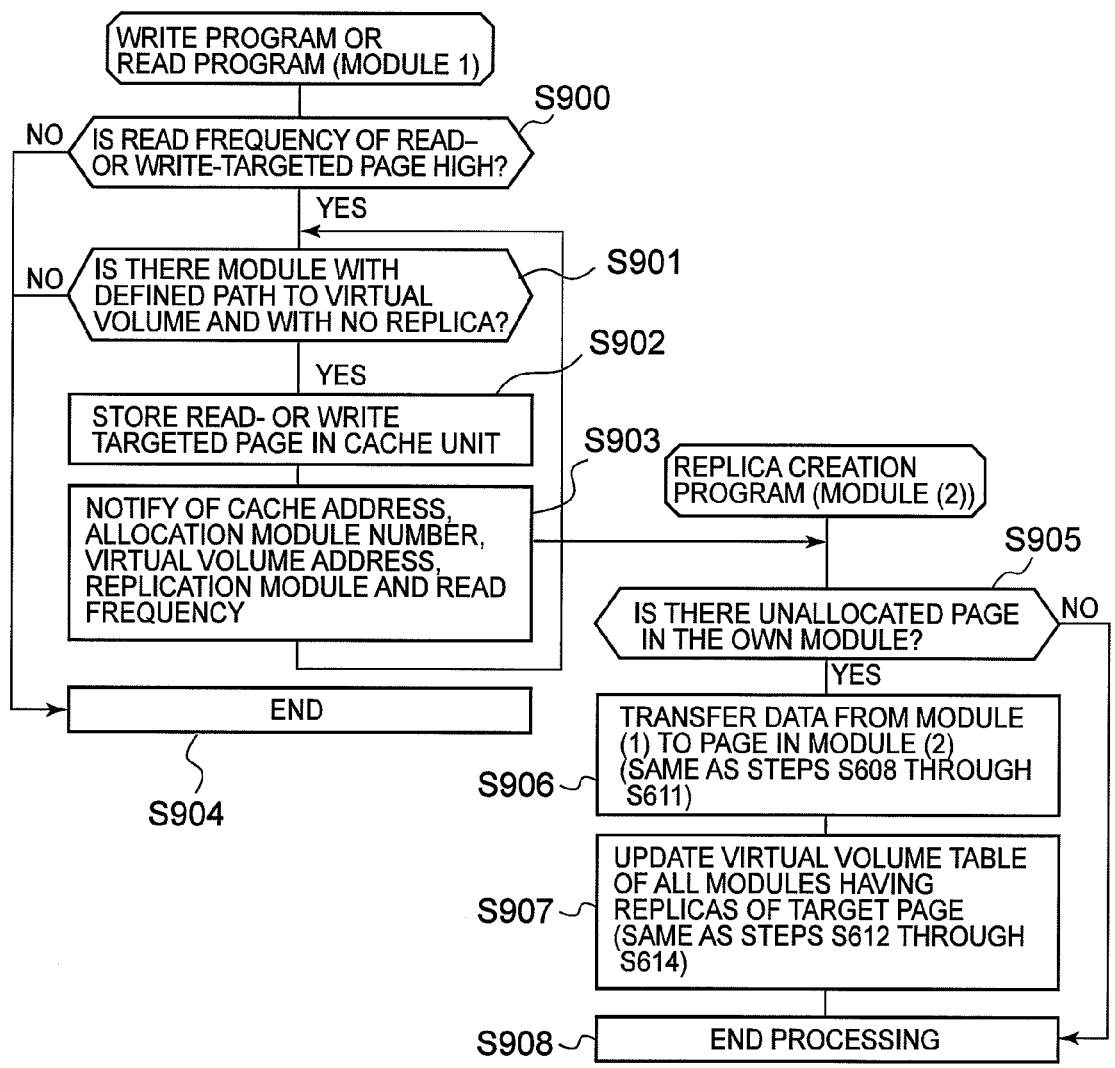
FIG. 23 is a diagram showing another example of page replication processing during a read/write process.

Next, FIGS. 21 through 23 will be used to explain an example of processing for carrying out page replication from the own module to the other module that has a path to the I/O-targeted virtual volume 302 when issuing an I/O to a page 301 in the own module.

To realize this processing, the own module 200 must be able to recognize which module 200 has the path to the I/O-targeted virtual volume 302. This, for example, can be realized in accordance with the path information table 22111 shown in FIG. 21. That is, the number of the path-defined module is added to the path information table 22111 in the first embodiment for each path. The "path-defined module number" is the module number of the module 200 that has a path to the virtual volume 302 identified by the volume number. When a plurality of modules 200 has paths to the virtual volume 302 identified by the volume number, the module numbers of the plurality of modules 200 are stored as the values of the "path-defined module number".

FIG. 22 will be used to explain the process for changing the path-defined module numbers of the path information tables 22111 in the respective modules 200 at path definition time. Hereinafter, this change process will be explained by treating the module 200 having the port 261 used in a path definition as module (1), and a module 200 already having a path to the target virtual volume 302 as module (2).

This process is realized by the CPU 271 of the maintenance terminal 270 executing the maintenance program 273, and the path definition program 2223 in modules (1) and (2) being executed. Furthermore, this process can be a variation of the path definition process shown in FIG. 11.

The maintenance program 273 issues a path definition indication to module (1) (S800). At this time, in addition to notifying module (1) of the port number of the port 261 specified by the user and the volume number of the specified virtual volume 302, the maintenance program 273 also notifies module (1) of the module number of the module 200 that has defined the path to the virtual volume 302 of this volume number.

The path definition program 2223 of module (1), which receives the path definition indication, updates the virtual volume table 22121 as necessary by executing Steps S202 through S204 the same as the processing of FIG. 11.

Next, the path definition program 2223 registers the port number of the specified port 261, the volume number of the specified virtual volume 302, the module number of module (1), and the module number of the path-defined module 200 in the path information table 22111 (S801). Furthermore, the value notified from the maintenance program 273 is registered in the module number of the path-defined module 200.

Subsequent to updating the path information table 22111, the path definition program 2223 reports end to the maintenance program 273 of the maintenance terminal 270.

The maintenance program 273 notifies module (2), which already has a path to the path definition-targeted virtual volume 302, that module (1) has implemented a new path definition (S802), and waits for an end-report from module (2) (S803). Furthermore, the maintenance program 273 also delivers the module number of module (1), and the volume number of the target virtual volume 302 to module (2) at this time.

To execute Step S802, for example, the maintenance program 273 must be able to recognize that module (2) has a path to the target virtual volume 302. This, for example, can be realized as follows. That is, the maintenance program 273 issues a command to module (2) beforehand to define a path to the target virtual volume 302. By storing the contents of this previous command in the memory 272 of the maintenance terminal 270, the maintenance program 273 is able to recognize the fact that module (2) has a path to the target virtual volume 302.

The path definition program 2223 of module (2), which receives the notification from the maintenance program 273, updates the path information table 22111 (S804). More specifically, the path definition program 2223 adds the module number of the notified module (1) as the value of the "path-defined module number" in the row corresponding to the notified volume number. Subsequent to updating the path information table 22111, the path definition program 2223 reports end to the maintenance terminal 270 (S805).

The maintenance program 273 receives the end-report from the path definition program 2223 of module (2) (S806), and ends processing (S807).

Furthermore, in the example of FIG. 22, the module 200 that already has a path to the target virtual volume 302 was explained as being only module (2), but when there are three or more modules 200, the maintenance program 273 also executes Steps S802 through S807 for the respective modules 200 besides module (2).

Accordingly, it is possible for all modules 200 having paths to the target virtual volume 302 to recognize a module 200 that has a path to the relevant virtual volume 302.

FIG. 23 will be used to explain an example of a process for carrying out page replication to the other module having a path to the I/O-targeted virtual volume at I/O processing time. At this time, the own module 200 that receives the I/O request from the host 100 is treated as module (1), and the module 200 that constitutes the new replication destination is treated as module (2). Hereinafter, it is supposed that a write request has been received as the I/O request.

Subsequent to executing Step S506 of FIG. 12, write program (1) references virtual volume table (1), checks the read frequency of the write-targeted virtual area, and determines whether or not the read frequency is high (S900). When the read frequency is low (S900: No), write program (1) ends the processing (S904).

Conversely, when the read frequency is high (S900: Yes), write program (1) determines whether or not there is a module 200 which has a path to the write-targeted volume and which does not have a replica for the high-read-frequency virtual area (S901). More specifically, write program (1) checks the "path-defined module number" of path information table (1) and the "replication module" corresponding to the high-read-frequency virtual area in virtual volume table (1). When there is no pertinent module 200 (S901: No), write program (1) ends the processing (S904). As used here, the "pertinent module" is a module that does not comprise the value of the "replication module" of virtual volume table (1), but does comprise the value of the "path-defined module number" of path information table (1).

When a pertinent module 200 (in this example, module (2)) exists (S901: Yes), write program (1) stores the data stored in the replication-source page 301 allocated to the high-read-frequency virtual area in cache unit (1) (S902), and requests that the pertinent module 200 (module (2)) carry out a replication (S903). At this time, write program (1) notifies module (2) of the cache address of this data, the value of the "allocation module" for this high-read-frequency virtual area, the "address" value, "replication module" value, and "read frequency" value.

Write program (1) repeatedly executes Steps S901 through S903 in order to carry out page replication to different modules 200 as well.

Module (2) processing will be explained. The replica creation program 2226 of module (2), which receives the replication indication from module (1), determines whether or not there is an unallocated page 301 in module (2) (S905). If an unallocated page 301 does not exist (S905: No), the processing ends (S908). By contrast, when an unallocated page 301 exists (S905: Yes), the replica creation program 2226 transfers the targeted data from module (1) (the notified cache address) to module (2), and stores this data in the unallocated page 301 in module (2) (S906). This processing is the same as that of Steps S608 through S611 of FIG. 18.

Next, the replica creation program 2226 notifies all the modules 200 (except module (2), but inclusive of module (1)) that have pages 301 allocated to the target virtual area that module (2) has been newly added as the "replication module". The respective modules 200 that receive this notification add "module (2)" as the "replication module" value of the virtual volume table 22121 in these modules 200 (S907). This processing is the same as that of Steps S612 through S614 of FIG. 18.

As described hereinabove, it is possible to replicate write-data and other such targeted data to the other module 200 at write processing time. Furthermore, in the explanation, a write process was given as an example, but a read process can be realized in the same manner.

Now then, when data is only updated for the module 200 that received the write request for a certain virtual area, the data in this module 200 is post-update data, and the replicated data in the other module 200 becomes pre-update data. That is, the data content will differ. In this case, when the other module 200 receives a read request that has the above-mentioned certain virtual area as the read-targeted area from the host 100, there is the possibility of the pre-update data being transferred to the host 100.

A write process for avoiding an inconsistent state such as this will be explained hereinbelow. More specifically, a method for deleting a replicated page at write time, and a method for updating all replicated data at write time will be explained. In so doing, data that exists in the own module 200, which received the write request, will be treated as the original data, and data, which has the same content as this data and which exists in the other module 200, will be treated as the replicated data.

Figure 24:
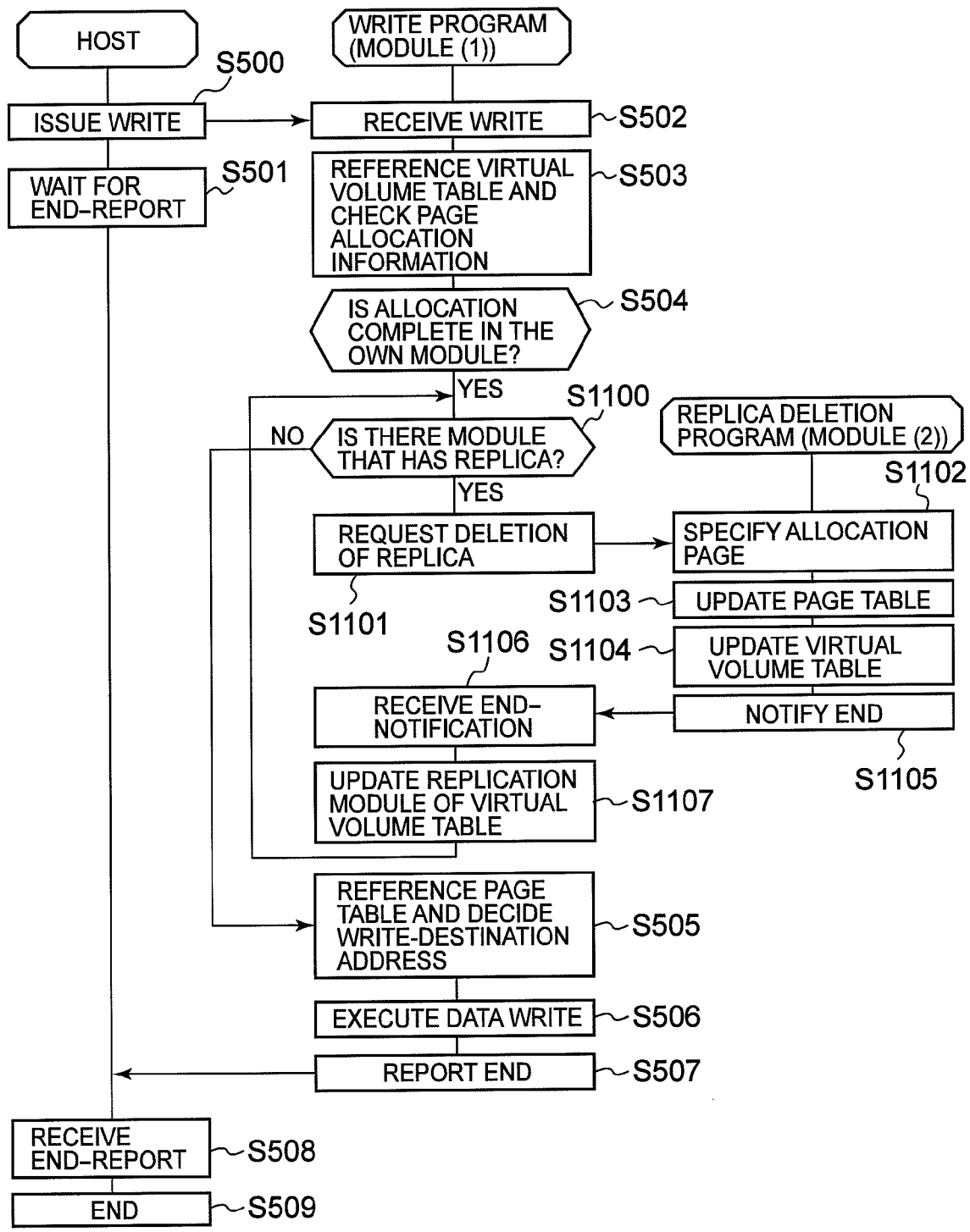
FIG. 24 is a diagram showing an example of replicated page deletion processing during a write process.

FIG. 24 will be used to explain an example of a process for deleting a replicated page of a module 200 other than the own module 200 at write processing time. In so doing, the own module 200 will be explained as module (1), and the other module 200 having the replicated page will be explained as module (2).

The processing shown in FIG. 24 is realized as follows. For example, the write program 2222 in module (1) is executed. The replica deletion program 2227 in module (2) is executed.

Furthermore, this processing is a variation of the write process shown in FIGS. 12 and 14. More specifically, in the case of FIG. 12, the processing for deleting a replica shown in FIG. 24 (S1101 through S1107) can be added between Steps S504 and S505. Further, in the case of FIG. 14, the processing for deleting a replica shown in FIG. 24 (S1100 through S1107) can be added between Steps S111 and S112 in Step S1011 (the same as S104 through S115). Furthermore, FIG. 24 shows all the steps that add the processing for deleting a replica (S1100 through S1107) to the processing of FIG. 12.

The write program 2222 recognizes that write-data is in module (1) (S500 through S504).

Next, the write program 2222 checks whether or not there is a module 200 that has replicated data corresponding to the write-data by referencing virtual volume table (1) (S1100). More specifically, write program (1) references the "replication module" corresponding to the write-targeted virtual area. When a pertinent module 200 does not exist (S1100: No), write program (1) executes a write process (S505 through S509).

When a pertinent module 200 (module (2)) exists (S1100: Yes), write program (1) requests that module (2) delete the replicated page (S1101). Write program (1), for example, notifies module (2) of the volume number of the write-targeted virtual volume, and the address of the write-targeted virtual area at this time.

The replica deletion program 2227 of module (2), which receives the request to delete the replicated page 301, specifies the replicated page 301 in module (2) (S1102). More specifically, the replica deletion program 2227 uses the virtual volume number and address notified from module (1) to reference virtual volume table (2).

Next, the replica deletion program 2227 deletes the allocation to the virtual area of the page 301 specified in Step S1102 (releases this page 301) by updating page table (2) and virtual volume table (2) (S1103 and S1104). More specifically, the value of "status" in page table (2) is changed to "unallocated" for the page 301 specified in Step S1102, and the value of "allocation destination" is changed to "–". Furthermore, the value of "allocation module" in virtual volume table (2) is changed to "module (1)" for the allocation-destination virtual area of this page 301, and the value of "replication module" is also changed to "–". The replicated data is deleted in this way. That is, in the second embodiment, "replicated page deletion" is the deletion of replicated page allocation (That is, the "status" of this page is changed from "allocated" to "unallocated".).

Subsequent to deleting the replicated page, the replica deletion program 2227 reports end to module (1) (S1105).

Write program (1), upon receiving the end-report from module (2) (S1106), updates virtual volume table (1) (S1107). More specifically, the value of "allocation module" in virtual volume table (1) is changed to "module (1)", and the value of "replication module" is also changed to "–".

Next, write program (1) repeatedly executes Steps S1100 through S1107 in order to delete the replicated page of a different module 200 as well.

The replicated page of the other module 200 can be deleted in this way.

Figure 25:
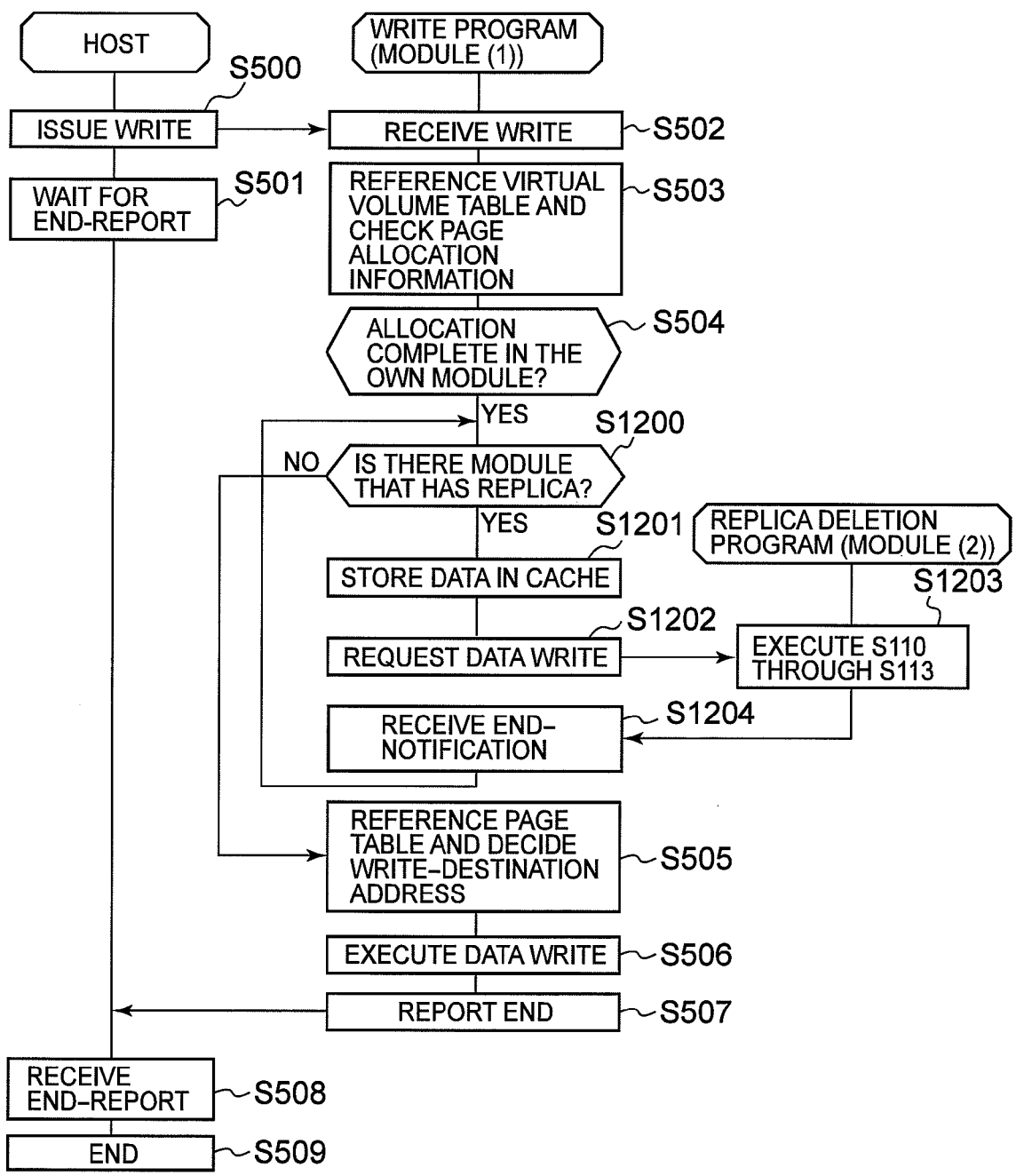
FIG. 25 is a diagram showing an example of replicated page update processing during a write process.

Next, FIG. 25 will be used to explain an example of a process for updating all replicated pages at the time of a write process. In so doing, the own module 200 will be explained as module (1), and the other module 200, which has a replicated page, will be explained as module (2).

The processing shown in FIG. 25 is realized by the write program 2222 being executed in modules (1) and (2).

Furthermore, this processing is a variation of the write processing shown in FIGS. 12 and 14. More specifically, in the case of FIG. 12, the processing for updating a replica of the other module 200 shown in FIG. 25 (S1200 through S1204) is added between Steps S504 and S505. Further, in the case of FIG. 14, the processing for updating a replica of the other module 200 shown in FIG. 25 (S1200 through S1204) is added between Steps S111 and S112 in Step S1011 (the same as S104 through S115). Furthermore, FIG. 25 shows all the steps that add the processing for updating a replica of the other module 200 (S1200 through S1204) to the processing of FIG. 12.

Write program (1) recognizes that write-data is in module (1) (S500 through S504).

Next, write program (1) checks whether or not there is a module 200 that has replicated data of the write-data by referencing virtual volume table (1) (S1200). More specifically, write program (1) references the "replication module" corresponding to the write-targeted virtual area. When a pertinent module 200 does not exist (1200: No), write program (1) executes a write process (S505 through S509).

When a pertinent module 200 (module (2)) exists (S1200: Yes), write program (1) stores the write-data in the cache unit 223 (S1201), and requests that module (2) write the write-data (S1202).

Write program (2) of module (2), which receives the request to write the write-data, stores the write-data in the replicated page 301 in module (2), and ends processing (S1203). This processing is the same as Steps S110 through S113 of FIG. 4.

Write program (1), upon receiving an end-report from module (2) (S1204), repeatedly executes Steps S1200 through S1204 to also update the replicated page 301 of a different module 200.

As described hereinabove, the data in the replicated page of the other module 200 can be updated in line with the updating of the write-data. Furthermore, for example, either a first or second update method can be employed as the replicated page update. The first update method is one in which post-update replicated data is written over data stored in the replicated page allocated to the virtual area. The second update method is one in which a new replicated page, in which post-update replicated data is stored, is allocated to the allocation-destination virtual area of the replicated page in place of this replicated page.

Hereinbelow, FIGS. 26 through 28 will be used to explain (1) the deletion of a replicated page at page 301 allocation; (2) the deletion of a replicated page at path deletion; and (3) the timed deletion of a replicated page.

Figure 26:
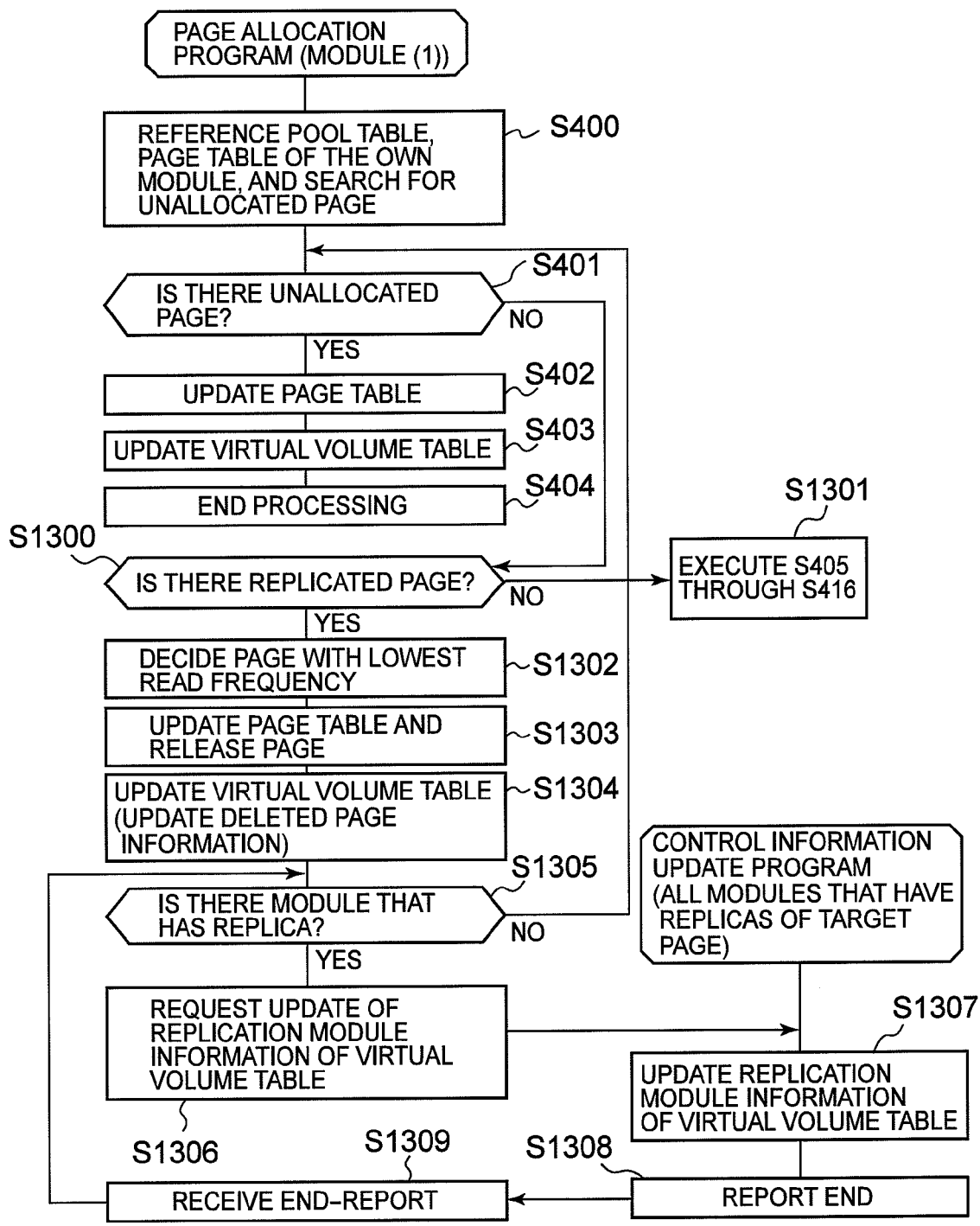
FIG. 26 is a diagram showing an example of replicated page deletion processing when a new page is allocated.

First, FIG. 26 will be used of explain an example of processing for deleting a replicated page when allocating a page 301. When a page has not been allocated to a write-targeted virtual area, it is possible that a page 301 capable of being allocated to this virtual area does not exist. A page for storing write-data can be secured at this time by deleting a replicated page 301. In the following explanation, the module 200 that receives the write request from the host 100 will be treated as module (1), and the module 200 that has a deletion-targeted replicated page will be treated as module (2).

The processing shown in FIG. 26, for example, is realized as follows. That is, the page allocation program 2225 is executed in module (1), and the control information update program 2228 is executed in module (2).

Furthermore, this processing can be realized by changing the page allocation process shown in FIG. 15. More specifically, processing for deleting the replicated page 301 in the own module 200 (S1300 through S1309) is added immediately prior to Step S405 of FIG. 15.

When allocating a new page 301, the page allocation program 2225 of module (1) determines whether or not an unused page 301 exists in module (1) (S400, S401).

When there is no unused page 301 in module (1) (S401: No), the page allocation program 2225 determines whether or not there is a replicated page 301 in module (1) (S1300). More specifically, a row in which the value of "replicated bit" is "ON" is searched for in the virtual volume table 22121. Furthermore, a volume other than the write-targeted volume is also a search target. That is, a replicated page allocated to a virtual volume 302 other than the write-targeted volume can also be deleted. When the result of the search is that a replicated page 301 does not exist (S1300: No), Steps S405 through S416 of FIG. 15 are executed, and processing ends (S1301).

Conversely, when a replicated page 301 does exist (S1300: Yes), the page allocation program 2225 references the "read frequency" of the replicated page 301, and decides the page 301 with the lowest "read frequency" value (S1302).

The page allocation program 2225 deletes the replicated page 301 by updating page table (1) and virtual volume table (1) (S1303, S1304). More specifically, the value of the replicated page 301 "status" is changed to "unallocated", and "allocation destination" is changed to "–" in page table (1). Furthermore, "module (1)" is deleted from the values of "allocation module" and "replication module" corresponding to the virtual area for which the replicated page 301 is the allocation destination in virtual volume table (1).

Next, the page allocation program 2225 determines whether or not there is the other module 200 (module (2)) that has a replicated page corresponding to the released replicated page 301 (S1305). When such other module 200 exists (S1305: Yes), the page allocation program 2225 notifies the pertinent the other module 200 of the fact that the replicated page 301 was released (S1306). The pertinent the other module 200, for example, is a module that corresponds to the value of the "replication module" corresponding to the virtual area to which the released replicated page had been allocated. The page allocation program 2225 notifies module (2) at the time of Step S1306 of the value of the "address" and the value of the "virtual volume number" corresponding to the virtual area to which the released replicated page had been allocated.

The control information update program 2228 in module (2), which receives the notification from module (1), deletes "module (1)" as the value of "allocation module" and "replication module" corresponding to the above-mentioned notified "address" and "virtual volume number" in virtual volume table (2) (S1307). Subsequent to this deletion, the control information update program 2228 reports end to module (1) (S1308).

The page allocation program 2225 of module (1) receives the end-report from module (2) (S1309). Then, the page allocation program 2225 repeatedly executes Steps S1305 through S1309.

Upon completing the notification to all modules 200 having a replicated page corresponding to the released replicated page 301, the page allocation program 2225 returns to Step S401, and executes page allocation processing relative to the write request (S402 through S404). Since the replicated page 301 was released, the determination in Step S401 becomes "Yes".

As described hereinabove, a situation in which a write cannot be carried out due to a shortage of pages can be avoided by releasing a replicated page 301.

Figure 27:
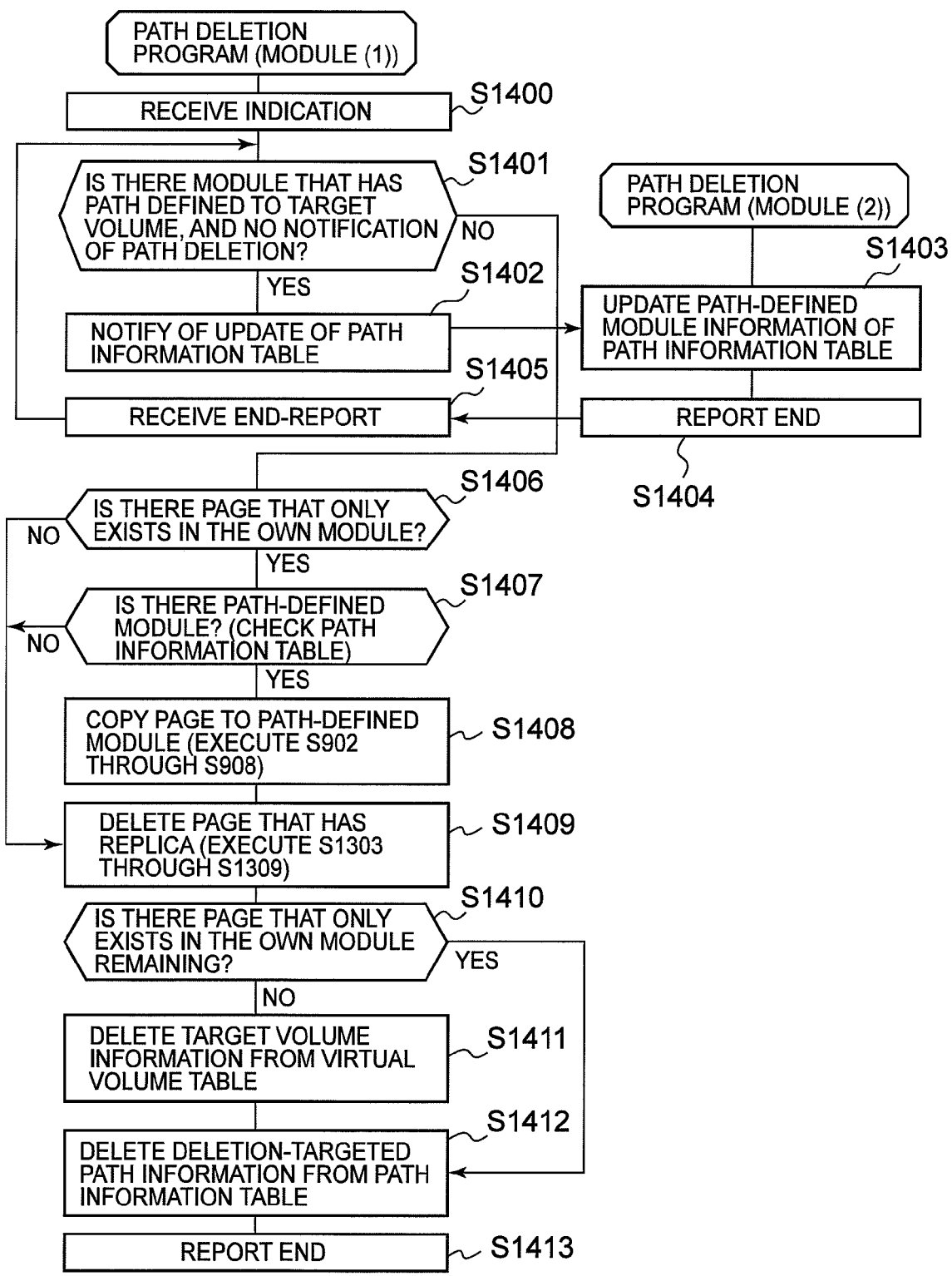
FIG. 27 is a diagram showing an example of replicated page deletion processing when a path is defined.

Next, FIG. 27 will be used to explain an example of processing for deleting a replicated page at path deletion time.

When deleting a path to the virtual volume, the module 200 having the port 261 used by the deletion-targeted path ceases to receive I/O requests from the host 100. Thus, executing a replicated page deletion is effective at this time.

The module 200 having the port 261 used by the deletion-targeted path will be explained as module (1), and the module 200 having a different path to the destination volume of the deletion-targeted path will be explained as module (2).

The processing shown in FIG. 27, for example, is executed as follows. The path deletion program 2224 is executed in module (1). The replica creation program 2226, path deletion program 2224 and control information update program 2228 are executed in module (2). Furthermore, the execution of these module (2) programs is triggered by a notification from module (1).

First, path deletion program (1) receives a path deletion indication (S1400). Furthermore, although not shown in the figure, this indication is issued from the maintenance program 273 of the maintenance terminal 270.

Next, path deletion program (1) determines whether or not there is the other module 200, which has a path to the destination volume of the target path, and, in addition, which has not been notified of the path deletion by module (1) (S1401). When the pertinent module 200 exists, the path deletion program 2224 notifies the pertinent module 200 of the updating of the path information table 22111 (S1402). The path deletion program 2224 notifies the pertinent module 200 of the volume number of the destination volume at this time.

Path deletion program (2) of module (2), which receives the path information table 22111 update notification from path deletion program (1), updates the path information capable of being specified in accordance with the volume number of the destination volume of the path information table 22111 (S1403). More specifically, "module (1)" is deleted as the value of "path-defined module".

Subsequent to the deletion, path deletion program (2) reports end to module (1) (S1404).

Path deletion program (1) of module (1) receives the end-report from module (2) (S1405). Then, path deletion program (1) repeatedly executes Steps S1401 through S1405 to also notify different modules 200 having paths to the destination volume of the updating of the path information table 22111.

Upon notifying all the modules 200 having paths to the destination volume of the updating of the path information table 22111, path deletion program (1) proceeds to Step S1406. The steps following Step S1406 is processing for copying a page 301 that only module (1) has to a page 301 of the other module 200, and for deleting in module (1) a page 301 that has been replicated in a module 200 other than module (1). Once the path has been deleted, module (1) does not receive I/O from the host 100. Thus, as described hereinabove, copying a page 301 to the other module 200 lowers the frequency of I/Os that span the modules 200.

Path deletion program (1) determines whether or not a page 301 that only exists in module (1) is among the pages 301 allocated to the destination volume of the deletion-targeted path (S1406). This processing can be realized by searching for the row in virtual volume table (1) in which the value of "replicated bit" is "OFF" and the value of "allocation module" is "module (1)". When there is a page 301 that only exists in module (1), path deletion program (1) determines whether or not there is the other module 200 that has a path to the destination volume of the deletion-targeted path (S1407). When the other module 200 (module (2)) having a path to the destination volume exists, path deletion program (1) replicates the data in the page 301 that exists only in module (1) in module (2) (S1408). This processing is the same as that of Steps S902 through S908 explained using FIG. 23. Next, path deletion program (1) deletes from module (1) that page 301 from among the pages 301 allocated to the destination volume for which a replicated page exists in a module other than module (1) (S1409). This processing is the same as that of Steps S1303 through S1309 explained using FIG. 26. Further, when the results of the determinations of Steps S1406 and S1407 are "No", Step S1408 is skipped, and Step S1409 is carried out.

Next, path deletion program (1) determines whether or not there is a page 301 that exists only in module (1) among the pages 301 allocated to the destination volume of the deletion-targeted path (S1410). This determination will constitute "Yes" (exists) when processing has proceeded from Steps S1407 through S1409, and when all of the pages 301 that exist only in module (1) cannot be replicated in module (2) in Step S1408. In this case, the information of the target volume cannot be deleted from virtual volume table (1) because there is the possibility of the data in module (1) being read/written via the port 261 of the other module 200. Accordingly, path deletion program (1) skips Step S1411 and proceeds to Step S1412.

In the meantime, when the determination of Step S1410 constitutes "No" (does not exist), path deletion program (1) deletes the information of the destination volume from virtual volume table (1) and proceeds to Step S1412.

Path deletion program (1) deletes the information of the deletion-targeted path from path information table (1), and reports end (S1413). Furthermore, the destination of the end-report is the maintenance program 273 of the maintenance terminal 270.

Figure 28:
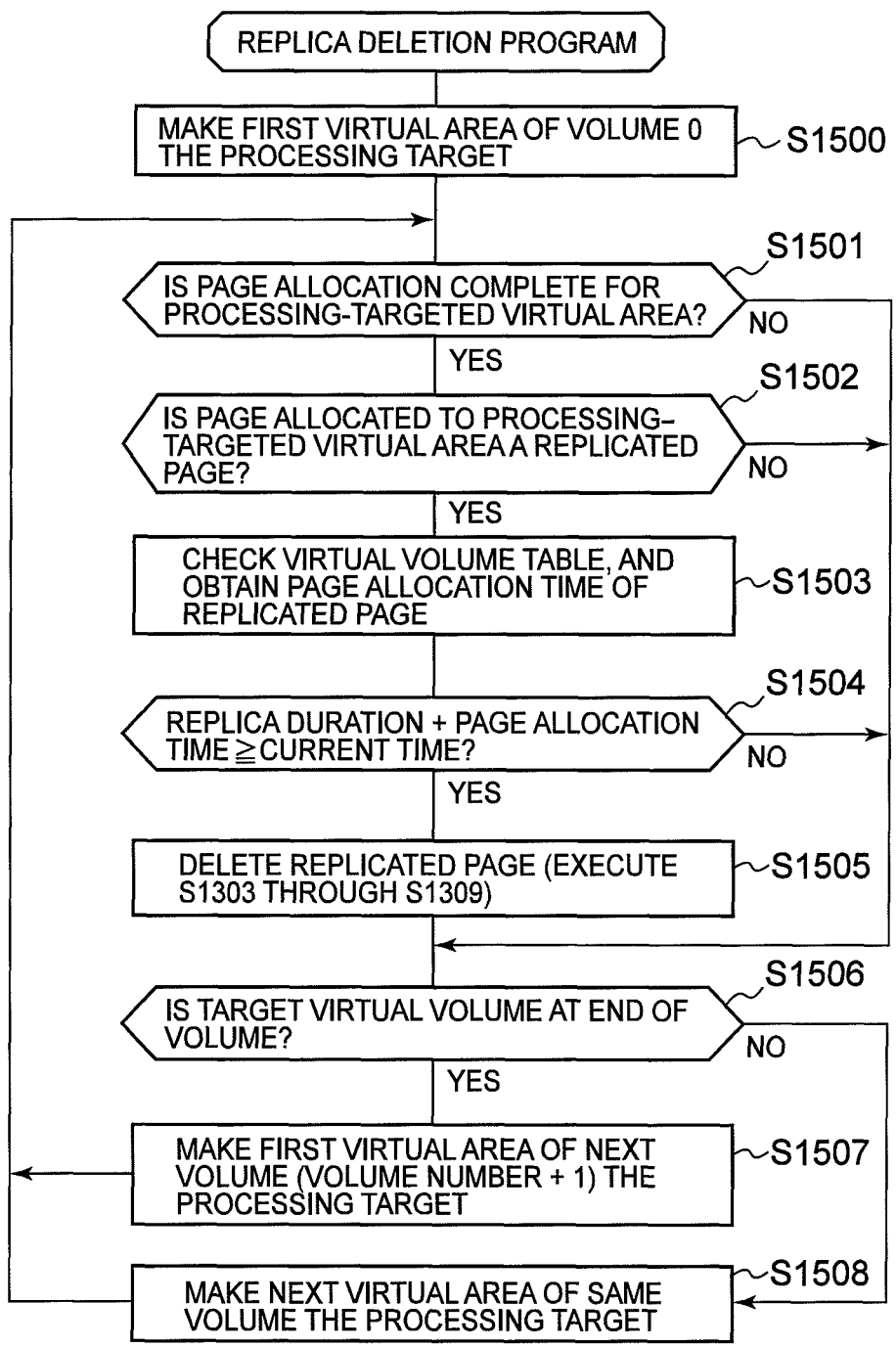
FIG. 28 is a diagram showing an example of replicated page deletion processing due to the passage of time.

FIG. 28 will be used to explain an example of processing for deleting a replicated page 301 for which a fixed time has passed since the replicated data was written. Furthermore, this processing can also be used in combination with the already described replicated page deletion at the time of a write, replicated page deletion at new page allocation time, and replicated page deletion at path definition time.

Furthermore, although not shown in the figure, the time at which a page 301 was allocated (hereinafter, page allocation time) is recorded in the virtual volume table 22121 to realize this processing. Further, hereinafter, the length of time that a replicated page 301 is saved without being deleted will be called the "replica duration". Hereinbelow, an explanation will be given using processing in module (1) as an example, but this processing is carried out by the replica deletion program 2227 in the respective modules.

Replica deletion program (1) sets the first virtual area of the virtual volume having the volume number "0" (in this embodiment, the address is from "0" to "99") as the processing target (S1500).

Next, replica deletion program (1) determines whether or not a page has been allocated to the processing-targeted virtual area (S1501). When page allocation has been completed, replica deletion program (1) determines whether or not the page 301 allocated by module (1) is a replica of a page 301 allocated by the other module 200 (S1502). This determination can be made by referencing virtual volume table (1) and determining whether or not "module (1)" exists as the "replication module" value.

When the result of either Step S1501 or Step S1502 is "No", replica deletion program (1) determines whether or not the current processing-targeted virtual area is at the end of the processing-targeted volume (S1506). When the current processing-targeted virtual area is at the end of the volume, replica deletion program (1) sets the first virtual area of the next volume (the volume having the next volume number) as the next processing target (S1507), and returns to Step S1501. Conversely, when the current processing-targeted virtual area is not at the end of the volume, replica deletion program (1) sets the next virtual area in the same volume as the processing target (S1508) and returns to Step S1501.

In the meantime, when both Steps S1501 and S1502 are "Yes", replica deletion program (1) obtains the value of "page allocation time" corresponding to the processing-targeted virtual area from virtual volume table (1) (S1503). Next, replica deletion program (1) determines whether or not (replica duration+page allocation time) is greater than the current time (S1504). When (replica duration+page allocation time) is equal to or greater than the current time, the replica deletion program 2227 deletes the replicated page 301 that has been allocated to the processing-targeted virtual area because the replicated page 301 exceeds the replica duration (S1505). This deletion processing is the same as that of Steps S1303 through S1309 that was explained using FIG. 26. Conversely, when (replica duration+page allocation time) is less than the current time, the replica deletion program 2227 proceeds to Step S1506 because the replica duration has not been exceeded, doing away with the need to delete the replicated page 301 allocated to the processing-targeted virtual area.

As described hereinabove, it is possible to delete a replicated page on the basis of time. Furthermore, the replica duration can be changed automatically in accordance with the read frequency of the replicated page 301. For example, the replica duration can be made longer for the replicated page allocated to a virtual area with a high read frequency. More specifically, for example, the value of the "read frequency" corresponding to the replicated page 301 allocated to the processing-targeted virtual area can be referenced in Step S1504 of FIG. 28, and the replica duration can be changed in accordance with this value.

Figure 29:
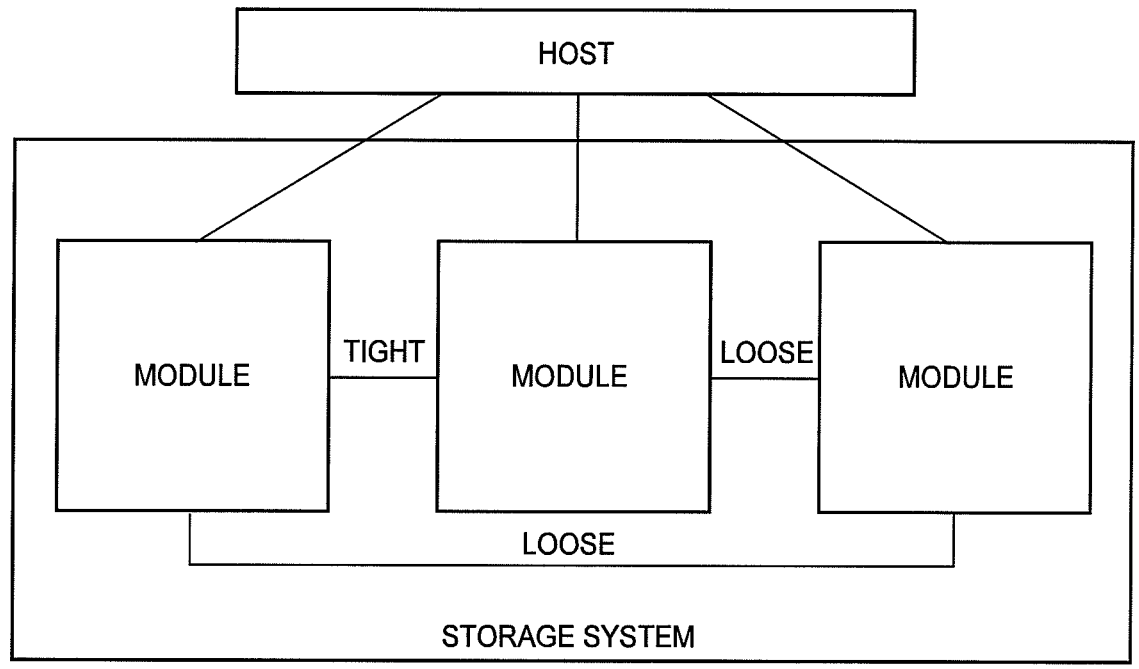
FIG. 29 is a diagram showing a variation of inter-module linkage.
Figure 30:
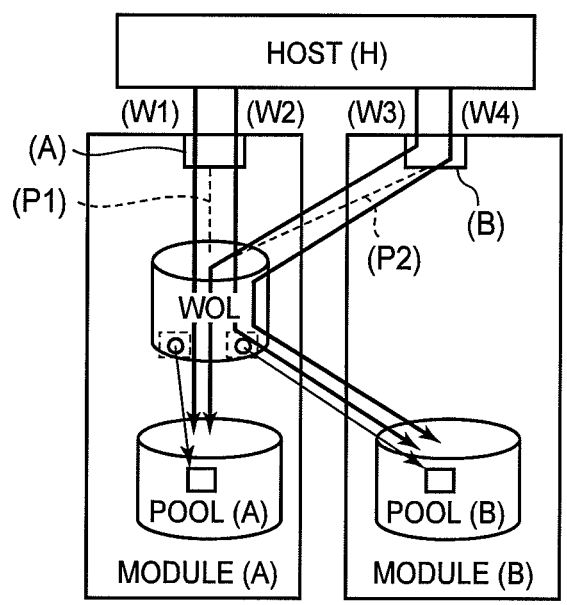
FIG. 30 is a schematic diagram of the problem.

Several preferred embodiments have been explained hereinabove, but these embodiments are examples for explaining the present invention, and do not purport to limit the scope of the present invention to these embodiments alone. The present invention can be put into practice in a variety of other modes. For example, instead of an identification number, another type of identifier can be used. For example, as shown in FIG. 29, the coupling with own module can be tight, and the coupling with another module can be loose.

What is claimed is:

1. A storage system that receives an I/O request from a computer and processes the I/O request, comprising:
  a first module and a second module,
  wherein the first module comprises:
  a first port that is coupled to the computer, to receive any said I/O request directed to the first port;
  a first virtual volume which is: configured from a plurality of first virtual areas;
  associated with the first port; and assigned a volume identifier;
  a first memory area that stores first virtual area management information, which is information related to respective first virtual areas of the plurality of first virtual areas;
  a first physical storage device;
  a first pool that is configured from a plurality of first real areas of the first physical storage device;
  a first I/O processor that processes the I/O request received via the first port; and
  a first module interface device that is coupled to the second module, and
  the first virtual area management information including an identifier of an allocation module, which is a module having an allocated real area for first virtual area of the plurality of first virtual areas,
  the second module comprises:
  a second port that is coupled to the computer, to receive any said I/O request directed to the second port;
  a second virtual volume which is: configured from a plurality of second virtual areas; associated with the second port; and assigned the same volume identifier as the volume identifier assigned to the first virtual volume;
  a second memory area that stores second virtual area management information, which is information related to respective second virtual areas of the plurality of second virtual areas;
  a second physical storage device;
  a second pool that is configured from a plurality of second real areas of the second physical storage device;
  a second I/O processor that processes the I/O request received via the second port; and
  a second module interface device that is coupled to the first module,
  the second virtual area management information including an identifier of an allocation module, which is a module having an allocated real area for each second virtual area of the plurality of second virtual areas, and
  (A) when the second module receives a write request (W1) from the computer and a real area has not been allocated to a write-targeted virtual area (V21) specified by the write request (W1), the second I/O processor searches for an unallocated second real area (R21) from among the plurality of second real areas, and:
  if said unallocated second real area (R21) is available, allocates said unallocated second real area (R21) to the second virtual area (V21), writes data according to the write request (W1) to the second real area (R21), and writes an identifier of the second module in the first and second virtual area management information as the identifier of the allocation module corresponding to the second virtual area (V21);
  if said unallocated second real area (R21) is not available, effects allocation of an unallocated first real area to the first virtual area, writes data according to the write request (W1) to the first real area, and writes an identifier of the first module in the first virtual area management information as the identifier of the allocation module corresponding to the first virtual area; and (B) when the first module receives a write request (W2) from the computer and a first real area has not been allocated to a write-targeted first virtual area (V11) specified by the write request (W2), the first I/O processor searches for an unallocated first real area (R11) from among the plurality of first real areas, and:

if said unallocated first real area (R11) is available, allocates said unallocated first real area (R11) to the first virtual area (V11), writes data according to the write request (W2) to the first real area (R11), and writes an identifier of the first module in the first and second virtual area management information as the identifier of the allocation module corresponding to the first virtual area (V11); and if said unallocated first real area (R11) is not available, effects allocation of an unallocated second real area to the second virtual area, writes data according to the write request (W2) to the second real area, and writes an identifier of the second module in the first and second virtual area management information as the identifier of the allocation module corresponding to the second virtual area.

2. The storage system according to claim 1, wherein the first virtual area management information comprises an identifier of a replication module for the each first virtual area, the replication module being a module that has a real area in which replicated data is stored, the replicated data being obtained by replicating data stored in a real area in the allocation module corresponding to the first virtual area, the second virtual area management information comprises an identifier of a replication module for the each second virtual area, the first module further comprises a first data replication unit, (C) the first data replication unit writes replicated data of data stored in the second real area (R21) to a real area (R12), which is an unallocated real area from among the plurality of first real areas, and which is to be allocated to a first virtual area (V12) of the same address as that of the second virtual area (V21), and writes the identifier of the first module in the first virtual area management information as the identifier of the replication module corresponding to the first virtual area (V12), and (D) the first module, upon receiving from the computer a read request in which the first virtual area (V12) is a read target, references the first virtual area management information, and if the replication module corresponding to the first virtual area (V12) is specified to be the first module even though the allocation module corresponding to the first virtual area (V12) is not the first module, reads out the data from the real area (R12) and transfers the acquired data to the computer.

3. The storage system according to claim 2, wherein the second module further comprises a second data replication unit, (E) the second data replication unit references the second virtual area management information, and specifies that the data, which is stored in the second real area (R21) allocated to the second virtual area (V21), is not replicated, and the first data replication unit executes the processing of the (C) for the first virtual area (V12) corresponding to the specified the second virtual area (V21).

4. The storage system according to claim 3, wherein the first virtual area management information comprises, for the each first virtual area, a read frequency which is the number of times per unit of time that the first virtual area is a read target, and the first I/O processor, in response to reception of a read request, updates the read frequency corresponding to a read-targeted first virtual area according to this read request, the second virtual area management information comprises, for the each second virtual area, a read frequency which is the number of times per unit of time that the second virtual area is a read target, and the second I/O processor, in response to reception of a read request, updates the read frequency corresponding to a read-targeted second virtual area according to this read request, and when the read frequency corresponding to at least one of the first virtual area (V12) and the second virtual area (V21) is higher than a reference value, the replication of data to the real area (R12) is carried out.

5. The storage system according to claim 4, wherein the first virtual area management information comprises, for the each first virtual area, a write frequency which is the number of times per unit of time that the first virtual area is a write target, and the first I/O processor, in response to reception of a write request, updates the write frequency corresponding to a write-targeted first virtual area according to this write request, the second virtual area management information comprises, for the each second virtual area, a write frequency which is the number of times per unit of time that the second virtual area is a write target, and the second I/O processor, in response to reception of a write request, updates the write frequency corresponding to a write-targeted second virtual area according to this write request; and the reference value, which is compared to the read frequency corresponding to at least one of the first virtual area (V12) and the second virtual area (V21), is a value based on the write frequency corresponding to at least one of the first virtual area (V12) and the second virtual area (V21).

6. The storage system according to claim 5, wherein, prior to the first virtual volume being defined in the first module, the real area (R21) is allocated to the second virtual area (V21) of the second virtual volume defined in the second module, and triggered by the first virtual volume associated with the first port being defined in the first module, the first module acquires, from the second module, the replicated data of data stored in the second real area (R21).

7. The storage system according to claim 5, wherein, triggered by the data according to the write request (W1) being written to the second real area (R21) in the (A), the first module acquires, from the second module, the replicated data of data stored in the second real area (R21).

8. The storage system according to claim 5, wherein (F) the second I/O processor notifies the first module that the second real area has been allocated to the second virtual area (V21), and the first I/O processor writes the identifier of the second module in the first virtual area management information as the identifier of the module corresponding to the first virtual area (V12) of the same address as that of the second virtual area (V21), (G) when receiving, from the computer, a read request in which the first virtual area (V12) that has the same address as that of the second virtual area (V21) is the read target, the first module references the first virtual area management information to specify that the real area allocated to the first virtual area (V12) is in the second module, acquires from the second module the data stored in the second real area (R21) allocated to the second virtual area (V21), and transfers the acquired data to the computer, and triggered by the data stored in the second real area (R21) being acquired in the operation (G), the operation (C) is carried out.

9. The storage system according to claim 8, wherein (H) when receiving, from the computer, a write request (W3) in which the write target is the second virtual area (V21) to which the second real area (R21) has been allocated, the second module sets the data, which is stored in the second real area for which the second virtual area (V21) is the allocation destination, as the data that accords with the write request (W3), and triggered by the operation (H), the first module acquires, from the second module, the data which is stored in the second real area allocated to the second virtual area (V21) and which accords with the write request (W3), and sets the data, which is stored in the first real area for which the first virtual area (V12) is the allocation destination, as the replicated data of the data that accords with the write request (W3).

10. The storage system according to claim 9, wherein the first module further comprises a first replica deletion unit, and the first replica deletion unit deletes the allocation of the first real area to the first virtual area of a deletion target, for which the allocation module is the second module and the replication module is the first module.

11. The storage system according to claim 10, wherein the first replica deletion unit, triggered by the association of the first port with the first virtual volume being deleted, deletes the allocation of the first real area to the first virtual area of a deletion target.

12. The storage system according to claim 10, wherein the first replica deletion unit, triggered by the number of the unallocated first real areas becoming a prescribed number or less, deletes the allocation of the first real area to the first virtual area of a deletion target.

13. The storage system according to claim 12, wherein the first replica deletion unit preferentially sets the first virtual area with the lower read frequency as the first virtual area of a deletion target.

14. The storage system according to claim 10, wherein the first module receives a write request (W4) from the computer, and the first replica deletion unit deletes the allocation of the first real area (R12) to the first virtual area (V12) when a first real area has not been allocated to the write-targeted first virtual area (V4) specified by the write request (W4), and the first module does not have the unallocated first real area.

15. The storage system according to claim 14, wherein the first replica deletion unit deletes the allocation of a first real area for which a fixed time has passed since the replicated data is written.

16. A storage control method realized by a storage system which comprises a plurality of modules for receiving an I/O request from a computer and processing the I/O request, each module comprising a port coupled to the computer, a physical storage device, a pool configured from a plurality of real areas of the physical storage area, and a module interface device coupled to another module, wherein the plurality of modules have a common virtual volume configured from a plurality of virtual areas of the plurality of modules, respectively, where each virtual area of the plurality of virtual areas is assigned a same volume identifier;

the storage control method comprising:

if a real area has not been allocated to a write-targeted virtual area specified by a write request, a first module receiving the write request from the computer, searches for an unallocated real area from among the plurality of real areas in the first module, and:

if the unallocated real area is available, allocates the unallocated real area to the write-targeted virtual area as an allocated real area, writes data according to the write request to the allocated real area, and writes an identifier of the first module in a write-targeted virtual area management information of the first module and a virtual area management information of the another module as the identifier of the allocation module corresponding to the first virtual area; and if the unallocated real area is not available, effects allocation of another unallocated real area of another module, to the write-targeted virtual area as another allocated real area, writes data according to the write request to the another allocated real area, and writes an identifier of the another module in a write-targeted virtual area management information of the first module and a virtual area management information of the another module as the identifier of the allocation module corresponding to the another module.

17. The storage control method according to claim 16, wherein the first module notifies a second module, which is a module other than the first module from among the plurality of modules, that a real area in the first module has been allocated to the write-targeted virtual area, a certain second module writes replicated data of data stored in the allocated real area to a real area, which is an unallocated real area from among the plurality of real areas in the certain second module and which is to be allocated to a virtual area having the same address as that of the write-targeted virtual area, and when receiving, from the computer, a read request in which the virtual area having the same address as that of the write-targeted virtual area is a read-targeted virtual area, the certain second module reads out data from a real area in the certain second module allocated to this virtual area, and transfers the read-out data to the computer.

18. A storage system module that receives an I/O request from a computer, comprising:

a port that is coupled to the computer, to receive any said I/O request directed to the port;

a virtual volume that is: configured from a plurality of virtual areas; associated with the port; and assigned a volume identifier, wherein the volume identifier is assigned in common with the virtual volume of another storage system module such that the virtual volumes appear as a unitary virtual volume;

a storage medium that stores virtual area management information, which is information related to respective virtual areas of the plurality of virtual areas;

a physical storage device;

a pool that is configured from a plurality of real areas of the physical storage device;

an I/O processor that processes the I/O request received via the port; and a module interface device that is coupled to the other module, the virtual area management information includes, for each virtual area, an identifier of an allocation module which is a module having an allocated real area, and when receiving a write request from the computer, if a real area has not been allocated to a write-targeted virtual area specified by this write request, the I/O processor searches for an unallocated real area from among the plurality of real areas in this module, and:

if the unallocated real area is available, allocates the unallocated real area to the write-targeted virtual area as an allocated real area, writes data according to the write request to the allocated real area, and writes an identifier of the first module in a write-targeted virtual area management information of the first module and a virtual area management information of the another module as the identifier of the allocation module corresponding to the first virtual area; and if the unallocated real area is not available, effects allocation of another unallocated real area of another module, to the write-targeted virtual area as another allocated real area, writes data according to the write request to the another allocated real area, and writes an identifier of the another module in the first and second virtual area management information as the identifier of the allocation module corresponding to the another module.

19. The storage system module according to claim 18, further comprising a first replication processor that transfers the replicated data of data stored in the allocated real area to another module besides this module.

20. The storage system module according to claim 19, further comprising a second replication processor that acquires, from another module other than this module, replicated data of data stored in a real area in the other module, and writes the acquired replicated data to a real area, which is in the other module, which has the same address as that of an allocation-destination virtual area of this real area, and which is to be allocated to a virtual area in the virtual volume in this module.

21. The storage system according to claim 1, wherein when the first module receives a read request from the computer, if a first real area has been allocated to a read-targeted virtual area specified by the read request, the first I/O processor reads out, from the first real area, data according to the read request, and transfers the read-out data to the computer.

22. The storage system according to claim 1, wherein the first virtual volume and the second virtual volume are recognized as a single logical volume by the computer.

23. The storage control method according to claim 16, wherein the first virtual volume and the second virtual volume are recognized as a single logical volume.

24. The storage system module according to claim 18, wherein the first virtual volume and the second virtual volume are recognized as a single logical volume by the computer.

* * * * *